United States Patent [19]

Brooks

[11] Patent Number: 5,198,649
[45] Date of Patent: Mar. 30, 1993

[54] BAR CODE SCANNER AND METHOD OF SCANNING BAR CODES LABELS WITH OR WITHOUT AN ADD-ON CODE

[75] Inventor: Michael T. Brooks, Veneta, Oreg.

[73] Assignee: Spectra-Physics, Inc., Wilmington, Del.

[21] Appl. No.: 722,597

[22] Filed: Jun. 27, 1991

Related U.S. Application Data

[63] Continuation of Ser. No. 387,147, Jul. 31, 1989, abandoned.

[51] Int. Cl.$^5$ ............................................. G06K 7/10
[52] U.S. Cl. .................................... 235/462; 235/463; 235/470
[58] Field of Search ................ 235/462, 472, 463, 470

[56] References Cited

U.S. PATENT DOCUMENTS

| | | | |
|---|---|---|---|
| 4,109,143 | 8/1978 | Yamaguchi et al. | 235/419 |
| 4,152,583 | 5/1979 | Nakamura | 235/462 |
| 4,282,926 | 8/1981 | Neseem et al. | 235/463 |
| 4,717,818 | 1/1988 | Broockman et al. | 235/462 |
| 4,746,789 | 5/1988 | Gieles et al. | 235/463 |
| 4,794,239 | 12/1988 | Allais | 235/462 |
| 4,879,456 | 11/1989 | Cherry et al. | 235/463 |
| 4,937,439 | 6/1990 | Wanninger et al. | 235/470 |
| 4,958,064 | 9/1990 | Kirkpatrick | 235/470 |
| 5,086,215 | 2/1992 | Carsner et al. | 235/470 |
| 5,128,527 | 7/1992 | Kawai et al. | 235/463 |

OTHER PUBLICATIONS

Craig K. Harmon and Russ Adams. *Reading Between the Lines.* Jan. 1989. pp. 276-277.

Primary Examiner—Eugene R. LaRoche
Assistant Examiner—Christopher R. Glembocki
Attorney, Agent, or Firm—Killworth, Gottman, Hagan & Schaeff

[57] ABSTRACT

The scanner and scanning method of the present invention effect bar code scanning to determine the bar code data printed thereon by repeatedly sweeping a scanning beam in scan paths across the labels. The bar code labels bear bar codes of the type which include a primary code portion and which may also include an Add-On code portion. The method of the present invention includes the steps of sweeping a scanning beam across the label until the beam sweeps the entire primary code portion in a first scanning pass along a first scan path; immediately sweeping the scanning beam across the label in additional scanning passes along additional scan paths adjacent and parallel to the first scan path; and, if the beam sweeps the entire primary code portion in the additional scanning passes, and, if an Add-On code portion is not scanned in part during either the first or additional scanning passes, then the data scanned during the first and additional scanning passes is accepted as valid scan data. This method is carried out by a computer controlled scanner.

12 Claims, 6 Drawing Sheets

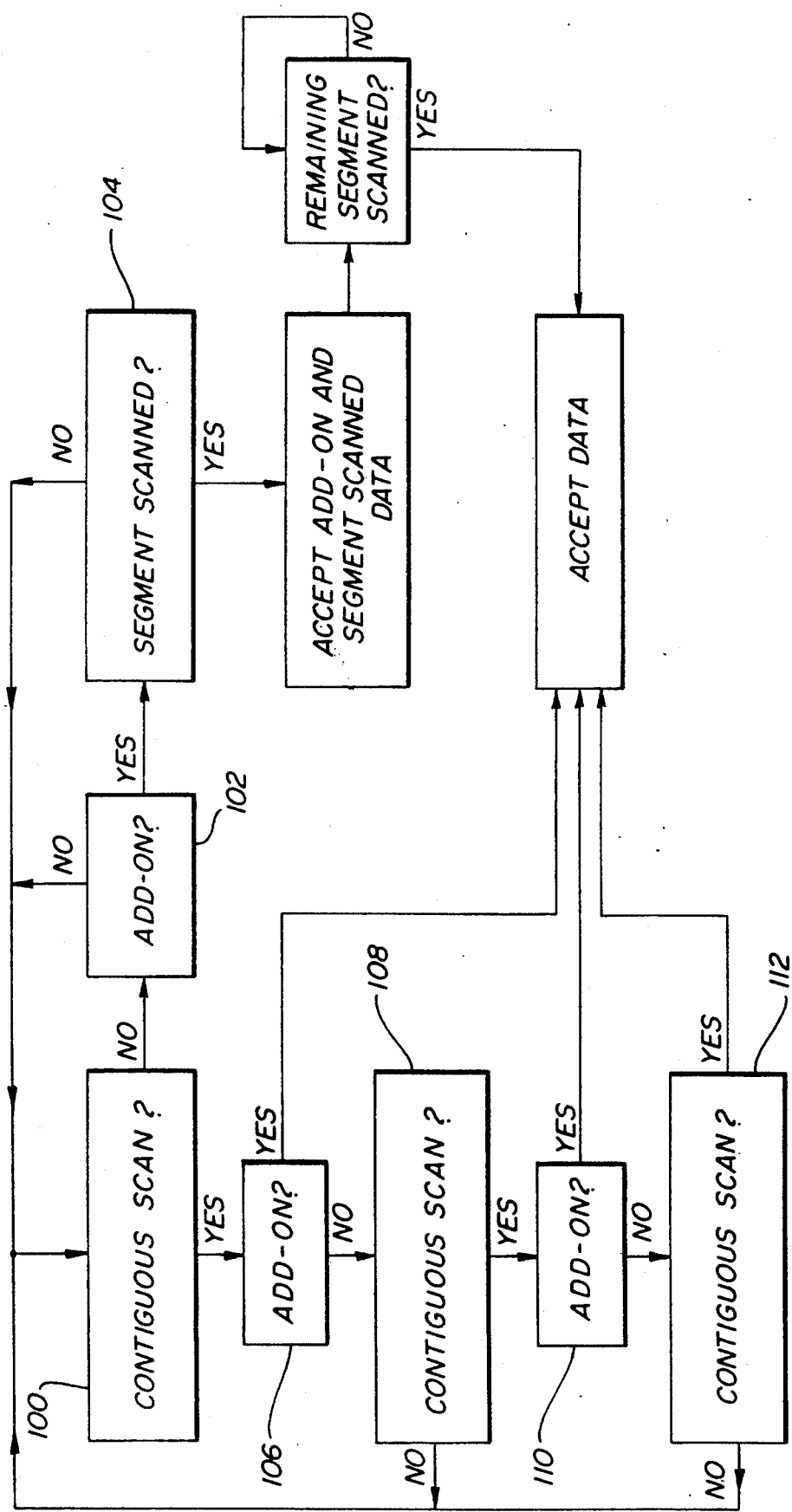

BAR CODE SCANNER AND METHOD OF SCANNING BAR CODES LABELS WITH OR WITHOUT AN ADD-ON CODE

This is a continuation of application Ser. No. 387,147, filed Jul. 31, 1989, abandoned.

BACKGROUND OF THE INVENTION

The present invention relates to a computer controlled bar code scanner and a method of scanning and, more particularly, to such scanning apparatus and to such a method in which bar code labels of the type including add-on codes, as well as bar code labels which exclude such add-on codes, may be scanned without the need for operator adjustment of the scanning apparatus.

Numerous types of stationary laser scanners are known in which a beam of laser light is swept in a scan pattern to find and read a bar code printed on a surface which is presented to the scanner, such as for example a package label. Bar code labels are used on a broad range of retail packages for check-out and inventory purposes. A scanner, located for example at the check-out station in a retail establishment, is used by a clerk automatically to enter product identification data into an associated computer system.

Typically such a scanner includes a laser source, such as a gas discharge laser, which produces a low power laser beam. The beam then passes through appropriate optical lenses and is swept across the package surface by a motor-driven, rotating mirror assembly. The package bearing a bar code label is presented manually to the scanner by a clerk. A portion of the light reflected from the package surface returns through the optical lenses to a detector which provides an electrical signal in dependence upon the level of the reflected light. A signal processing system in the scanner then analyses the electrical signal and translates the scanned characters into data which is transmitted to the host computer.

The computer determines the total price of the products being purchased, as well as storing the identity of the purchased products for inventory and accounting purposes. The host computer may be located in the cash register associated with the scanner. Alternatively, a single host computer may service a number of scanners at the retail establishment.

A number of different bar codes have come into use. The more common ones are horizontal in design with alternating vertical dark bars and light spaces therebetween. The height of the bars has no purpose other than to permit a scanning beam to successfully pass over the entire length of the bar code to permit its reading in one scanning pass. Common codes include Code Three of Nine, Two of Five, Codabar, Two of Five Non-Interleaved, Two of Five Interleaved, UPC-A, UPC-E, EAN 13, and EAN 8. Also in use is a two or five character "Add-On" code for UPC and EAN labels. An Add-On code is simply an additional grouping of bars and spaces to one side of the primary bar code which includes additional data to be read by the scanner.

The basic requirement for high volume transaction laser scanners is to operate in a way that the store check-out clerk does not have to worry about the label orientation as the product label is passed over the scanner. The basic function of the scan pattern generating arrangement is to move the beam of laser light through a three dimensional pattern capable of finding and reading labels in as many label orientations as possible.

Since it is desired that the scanning beam sweep across all of the bar of the label in a single pass, bar code labels including an Add-On code present a particularly difficult problem. Such labels have a high aspect ratio, i.e., the ratio of their horizontal dimension to their vertical dimension is particularly large. As a consequence, the variations in orientation of the scan path of the scanning beam of light which will produce a successful read of such labels are more limited than is the case with labels which do not include an Add-On code. If a primary code area was read by a conventional scanner and no Add-On code was read during a scanning pass, this might have resulted from the particular orientation of the bar code label with respect to the scan path. Alternatively, this may also have resulted from reading a bar code label which did not include an Add-On code. Convention scanners have not been able to distinguish between these two situations.

Previously, the approach has been for the clerk operating a scanner to switch the scanner to a special setting when Add-On labels were to be read. In this setting, the scanner would acknowledge a valid "read+ only when the primary code and the Add-On code of a label were both read. When switched to the normal scanner setting, the scanner would read the primary code and ignore the Add-On code as superfluous. As will be appreciated, this process is time consuming and burdensome. Further, the possibility exists for an erroneous reading of a label in the event that the scanner were to be switched to the wrong setting.

Accordingly, there is a need for a scanner and a method of scanning in which bar code labels may be read automatically, whether or not they include an Add-On code.

SUMMARY OF THE INVENTION

This need is met by the scanner and scanning method of the present invention, in which bar code labels are scanned to determine the bar code data printed thereon by repeatedly sweeping a scanning beam in scan paths across the labels. The bar code labels bear bar codes of the type which include a primary code portion and which may also include an Add-On code portion. The method of the present invention includes the steps of sweeping a scanning beam across the label until the beam sweeps the entire primary code portion in a first scanning pass along a first scan path; immediately sweeping the scanning beam across the label in a second scanning pass along a second scan path adjacent and parallel to the first scan path; and, if the beam sweeps the entire primary code portion in the second scanning pass, and, if an Add-On code portion is not scanned in part during either of the first or second scanning passes, then accepting the data scanned during the first and second scanning passes as valid scan data.

The method of scanning bar code labels may include the additional step of accepting the data scanned during the first and second scanning passes as valid scan data if the beam sweeps the entire primary code portion in the second scanning pass, and if an Add-On code portion is scanned in its entirety during the first and the second scanning passes.

The method of scanning bar code labels may include the additional step of rejecting the data scanned during the first and second scanning passes as invalid scan data if the beam does not sweep the entire primary code portion in the second scanning pass, or if an Add-On code portion is scanned in part during either of the first or second scanning passes.

The method of scanning bar code labels may include the additional steps of:
- determining if the beam sweeps the primary code portion of a UPC-E bar code label during the first and second scanning passes and, if so, immediately sweeping the scanning beam across the label in third and fourth scanning passes along third and fourth respective scan paths adjacent and parallel to the first and second scan paths; and
- if the beam sweeps the entire primary code portion in the third and fourth scanning passes, and if an Add-On code portion is not scanned in part during any of the first, second, third, or fourth scanning passes, then accepting the data scanned during the first, second, third, and fourth scanning passes as valid scan data.

The method of scanning bar code labels may include the additional step of accepting the data scanned during the first, second, third and fourth scanning passes as valid scan data if the beam does sweep the entire primary code portion in the second, third and fourth scanning passes, and if an Add-On code portion is scanned in its entirety during all of the first, second, third and fourth scanning passes.

The method of scanning bar code labels may include the additional step of rejecting the data scanned during the first, second, third and fourth scanning passes as invalid scan data if the beam does not sweep the entire primary code portion in the second, third and fourth scanning passes, or if an Add-On code portion is scanned in part during any of the first, second, third or fourth scanning passes.

The method of scanning bar code labels may include the additional step of accepting the data scanned during the scanning pass as valid scan data if the beam sweeps the entire primary code portion or a segment of the primary code portion in a scanning pass, and if an Add-On code portion is scanned in its entirety during the same scanning pass.

A computer controlled bar code scanner according to the present invention scans bar code labels to determine the bar code data printed thereon by repeatedly sweeping a scanning beam in scan paths across the labels. The bar code labels bear bar codes of the type which include a primary code portion and which may also include an Add-On code portion. The scanner includes scanner means for sweeping a scanning beam across a scanning station and providing a scan signal indicating markings on surfaces presented to the scan station. The scanner further includes computer means, responsive to the scanner means, for interpreting the scan signal as scan data signified by scanned bar code labels. The scanner means sweeps the scanning beam across the label until the beam sweeps the entire primary code portion in a first scanning pass along a first scan path and immediately sweeps the scanning beam across the label in a second scanning pass along a second scan path adjacent and parallel to the first scan path. If the beam sweeps the entire primary code portion in the second scanning pass, and if an Add-On code portion is not scanned in part during either of the first or second scanning passes, then the computer means accepts the data scanned during the first and second scanning passes as valid scan data.

The computer means accepts the data scanned during the first and second scanning passes as valid scan data if the beam sweeps the entire primary code portion in the second scanning pass, and if an Add-On code portion is scanned in its entirety during the first and the second scanning passes.

The computer means rejects the data scanned during the first and second scanning passes as invalid scan data if the beam does not sweep the entire primary code portion in the second scanning pass, or if an Add-On code portion is scanned in part during either of the first or second scanning passes.

If the beam sweeps the primary code portion of a UPC-E bar code label during the first and second scanning passes, the scanner means immediately sweeps the scanning beam across the label in third and fourth scanning passes along third and fourth respective scan paths adjacent and parallel to the first and second scan paths. If the beam sweeps the entire primary code portion in the third and fourth scanning passes, and if an Add-On code portions is not scanned in part during any of the first, second, third, or fourth scanning passes, then the computer means accepts the data scanned during the first, second, third, and fourth scanning passes as valid scan data.

The computer means accepts the data scanned during the first, second, third and fourth scanning passes as valid scan data if the beam does sweep the entire primary code portion in the second, third and fourth scanning passes, and if an Add-On code portion is scanned in its entirety during all of the first, second, third and fourth scanning passes.

The computer means rejects the data scanned during the first, second, third and fourth scanning passes as invalid scan data if the beam does not sweep the entire primary code portion in the second, third and fourth scanning passes, or if an Add-On code portion is scanned in part during any of the first, second, third or fourth scanning passes. The computer means accepts the data scanned during the scanning pass as valid scan data if the beam sweeps the entire primary code portion or a segment of the primary code portion in a scanning pass, and if an Add-On code portion is scanned in its entirety during the same scanning pass.

Accordingly, it is an object of the present invention to provide a bar code scanner and scanning method in which bar code labels are scanned to determine the bar code data printed thereon by repeatedly sweeping a scanning beam in scan paths across the labels; to provide such a bar code scanner and scanning method in which the labels bear bar codes of the type which include a primary code portion and which may also include an Add-On code portion; and to provide such a bar code scanner and scanning method in which labels including an Add-On code portion and labels without such a portion may be scanned without the need for the operator differentiate between such labels and adjust the operation of the scanner.

Other objects and advantages of the invention will be apparent from the following description, the accompanying drawings and the appended claims.

BRIEF DESCRIPTION OF THE DRAWINGS

FIG. 10 is a flow chart, illustrating an alternative method of the present invention.

DETAILED DESCRIPTION OF THE PREFERRED EMBODIMENT

Figure 1:
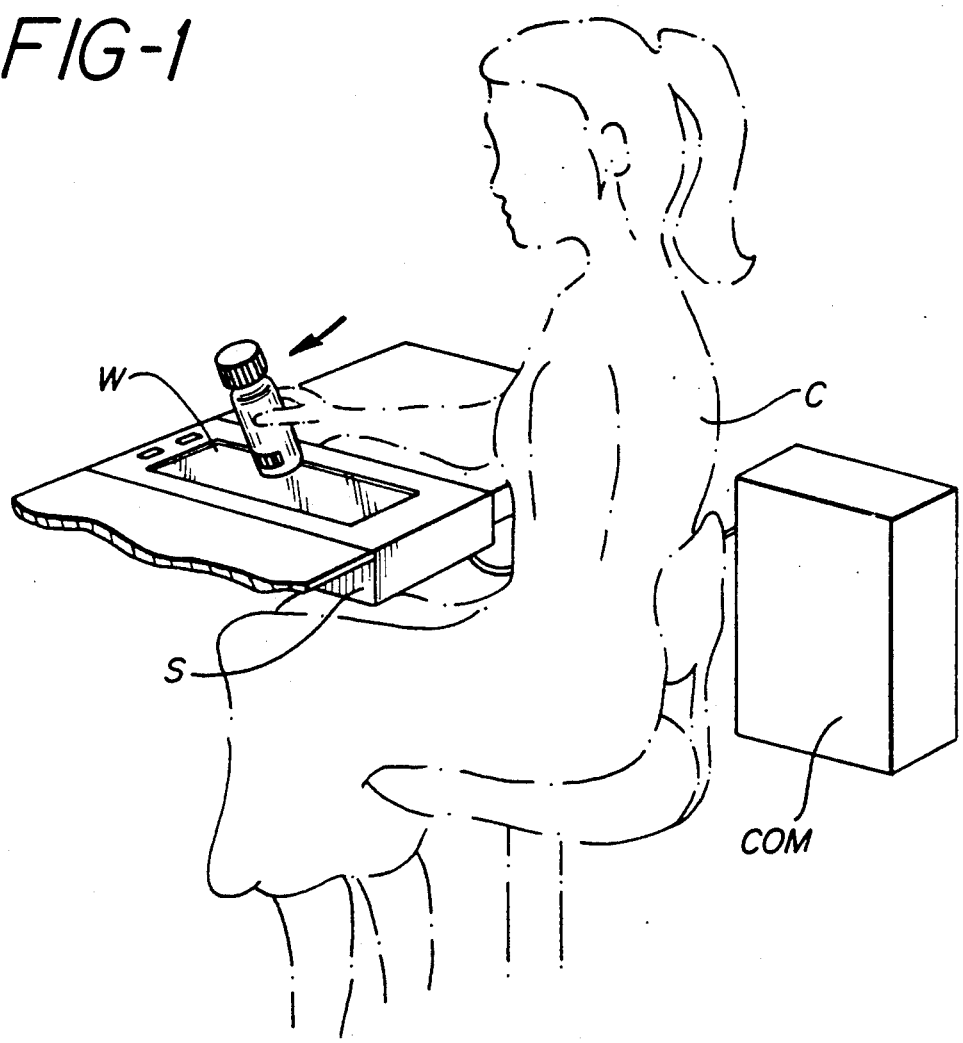
FIG. 1 is a pictorial view of a sales clerk at a checkout counter, presenting a product carrying a bar code label at a scanning station above the window of a laser scanner.

Reference is made to FIG. 1 of the drawings which illustrates a computer controlled bar code scanner according to the present invention for scanning bar code labels to determine the bar code data printed thereon. As is explained more fully below, this bar code scanner is capable of scanning bar code labels having scan data printed thereon in bar codes of the type which include a primary code portion and which may also include an Add-On code portion. FIG. 1 is a pictorial view of a sales clerk C at a check-out counter, with a laser scanner system of this type being used to scan a product label.

The clerk C manually passes the product across a scanning station over a window W. The scanning beam emerges from the window so as to permit the beam to be swept across the label. A portion of the light reflected from the label passes downward from the arrangement of bars on the product label. The beam is caused to rapidly sweep through a series of scan paths which collectively produce a scan pattern in which the likelihood of a successful scan is high. It is desired that the scan pattern be such that it is highly probable that at least one scan path will traverse the label in a direction more or less perpendicular to the bars making up the bar code.

The scanner of the present invention includes a scanner S comprising a scanner means for sweeping a scanning beam across the scanning station and providing a scan signal indicating markings on surfaces presented to the scan station. The scanner also includes computer means, such as personal computer COM, which is responsive to the scanner S for interpreting the scan signal as scan data signified by scanned bar code labels. The computer COM controls operation of the scanner S, determines whether a bar code label has been scanned properly, and whether valid scan data has been obtained.

Figure 2:
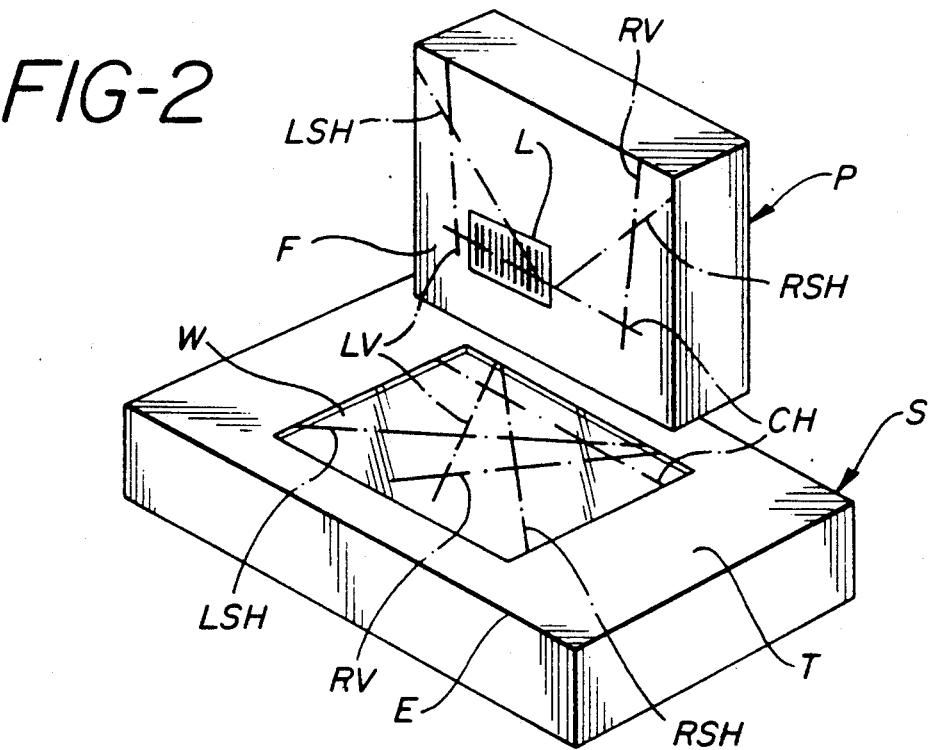
FIG. 2 is a perspective view of the laser scanner and a package disposed above the scanner and parallel to the front edge thereof and in a vertical position wherein a cross bar X scan pattern is projected on the scanner window and on the package face.

In common with many scanners in use today, the illustrated scanner uses a variation of what can be called a "cross-bar X" scan pattern. FIG. 2 illustrates this scan pattern on the window W of the scanner S and on a face F of a package P, bearing a bar code label L, disposed parallel to the front edge E of the scanner S and in a vertical position. The cross bar X pattern consists of five basic scan lines: the center horizontal (CH) line, right and left side horizontal (RSH & LSH) lines, and right and left vertical (RV & LV) lines. Note the orthogonality of the RV and LV scan lines with the CH scan lines. Also note that in this instance, the CH scan line passes over the bar code label in a direction which is generally perpendicular to the bars making up the code.

Figure 3:
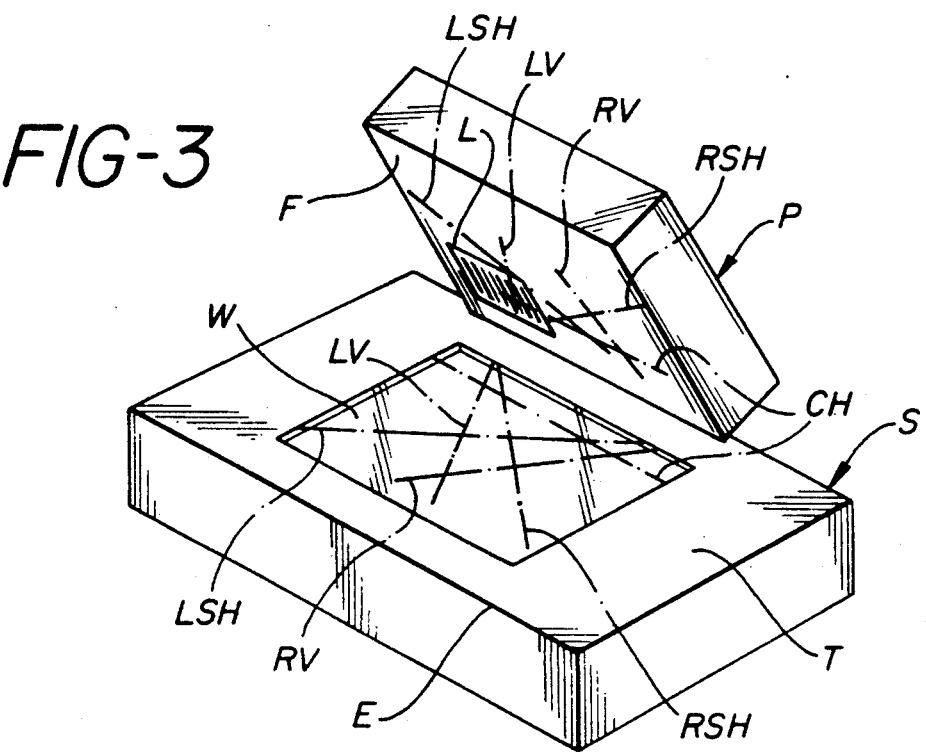
FIGS. 3-5 are perspective views similar to that of FIG. 2 but showing the cross bar X scan pattern on a package disposed at different orientations with respect to the laser scanner.
Figure 4:
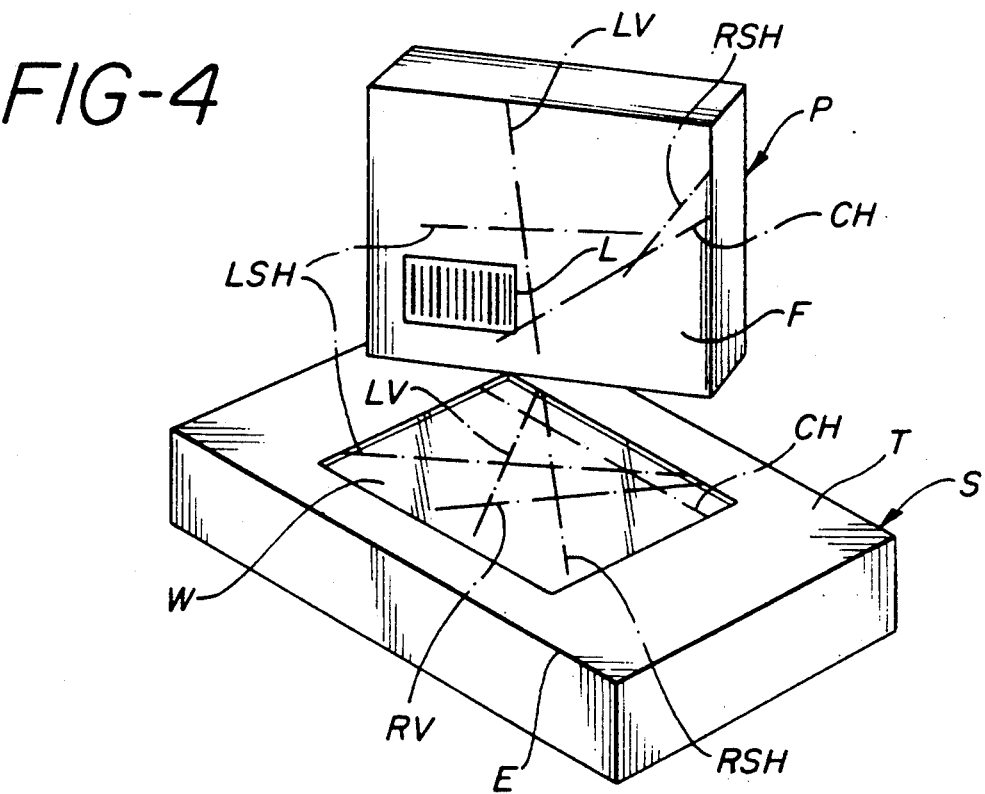
Figure 5:
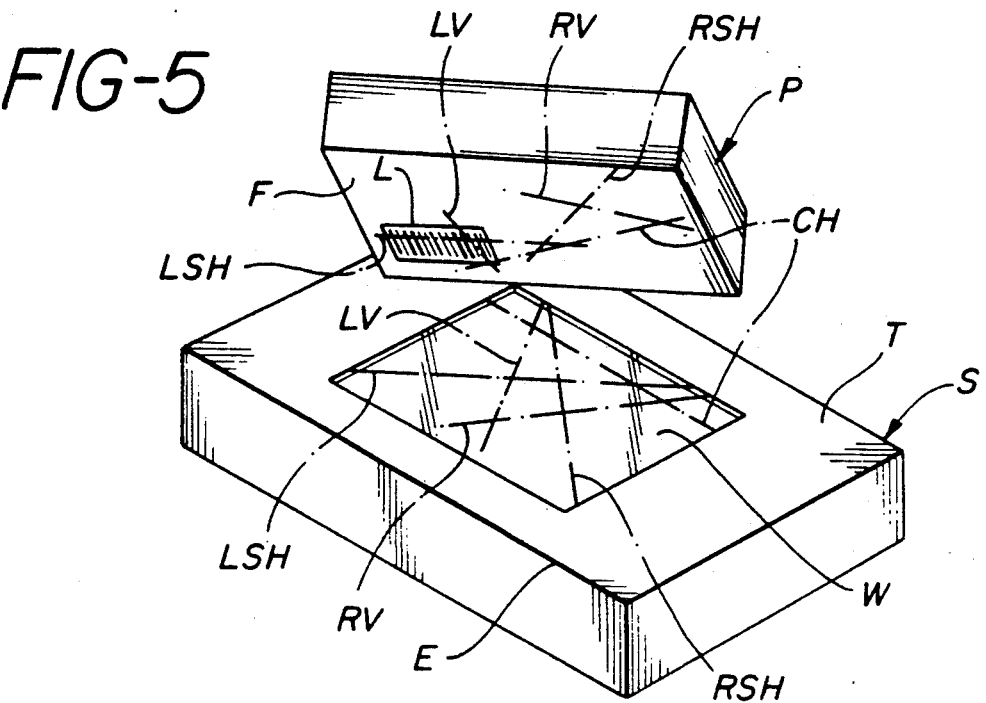

A more intuitive understanding of this scan pattern can be gained by examining depictions of the scan pattern on the package P in different orientations, as shown in FIGS. 3-5. In FIG. 3, the package face F is disposed parallel to the front edge E of the scanner S but leaned forty-five degrees toward the top T of the scanner. Note the orthogonality of the RV and RSH scan lines. In FIG. 4, the package face F is disposed in a vertical position but rotated forty-five degrees from the front edge E of the scanner S. Note the orthogonality of the LV and LSH scan lines. In FIG. 5, the package face F is rotated forty-five degrees from the front edge E of the scanner S and leaned forty-five degrees toward the top T of the scanner. Note the orthogonality of the LV and CH scan lines. In each of FIGS. 3-5, there is at least one set of perpendicularly crossing scan lines even though the label planes are at very different locations. Also note that scan lines CH and LSH are properly positioned for scanning the label L in FIGS. 2 and 5, respectively, that a scan line does not cross the label L in FIG. 4, and that scan lines LV and CH only pass over a portion of the bar code in FIG. 3.

Figure 6:
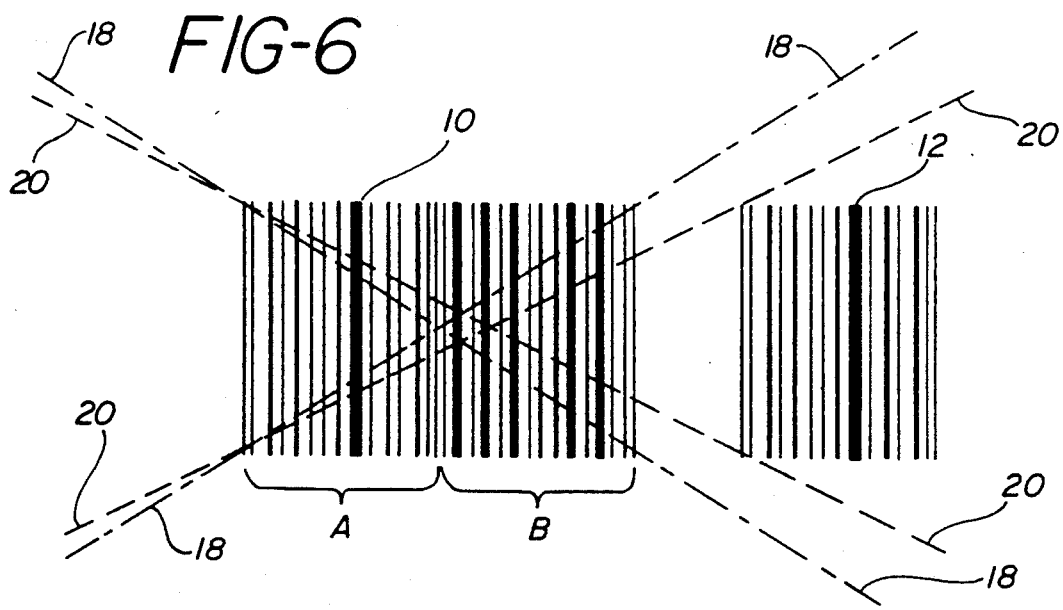
FIG. 6 is a pictorial representation of a two-segment UPC bar code, including a primary code portion and an Add-On code portion.
Figure 7:
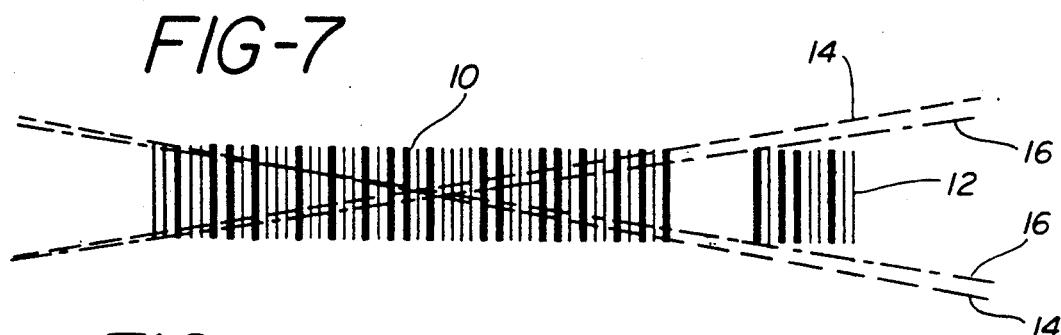
FIG. 7 is a pictorial representation of a Two of Five Non-Interleaved bar code, including a primary code portion and an Add-On code portion.
Figure 8:
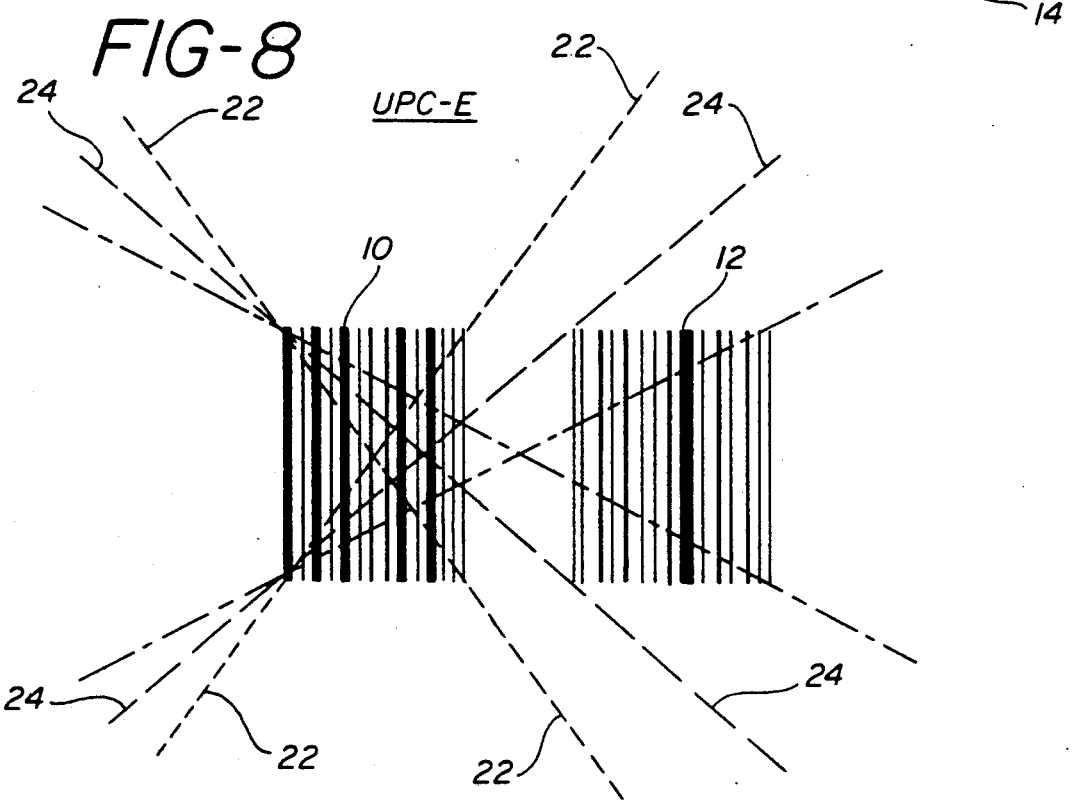
FIG. 8 is a pictorial representation of a one-segment UPC-E bar code, including a primary code portion and an Add-On code portion.

Reference is now made to FIGS. 6, 7, and 8 which depict several different bar codes. FIG. 6 shows a UPC-A bar code having a primary code portion 10 and an Add-On code portion 12. Most UPC code are two segment codes. That is, the primary code portion 10 is made up of an A segment and a B segment. Typically conventional scanners have permitted the two segments to be read during different scanning passes in order to increase the range of label orientations in which successful scanning may be accomplished. Similarly, FIG. 7 shows a Two of Five Non-Interleaved bar code having a primary code portion 10 and an Add-On code portion 12, and FIG. 8 shows a UPC-E bar code having a primary code portion 10 and an Add-On code portion 12. Both of these codes are single segment codes.

As discussed above, it has previously not been possible for a scanner to scan both bar codes having Add-Ons and non-Add-On bar codes without the operator differentiating between the two types of bar codes and providing to the scanner an indication of which type is currently being scanned. This has been true due to the geometry of the codes. Referring to FIG. 7, for instance, it will be seen that any number of successful scans of the primary code portion 10 may be made along scan lines between outer lines 14 and inner lines 16 without the scan line crossing the Add-On code portion 12. As a consequence, an ambiguity existed which was resolved by operator intervention in the scanner operation. This ambiguity was even greater with typical two-segment UPC codes, as illustrated by the spread between outer scan lines 18 and inner scan lines 20 in FIG. 6. Finally, the greatest ambiguity is found with respect to UPC-E bar codes, as illustrated by the spread between outer scan lines 22 and inner scan lines 24 in FIG. 8. This level of ambiguity is equaled in bar code scanners which permit either segment to be scanned alone during a single scanning pass.

The present invention overcomes these difficulties by making use of data produced during two or more successive scanning passes. It will be appreciated that in typical scanning arrangements, successive scan lines in a group are swept across a scanned surface as a series of spaced parallel scan lines. These successive scan lines are laterally separated because of the design of the scanning optics, it typically being felt that such would produce a greater likelihood of a scan line being properly positioned, and because of the relative movement between the scanner and the label as the operator moves the label across the scanning station.

Figure 9:
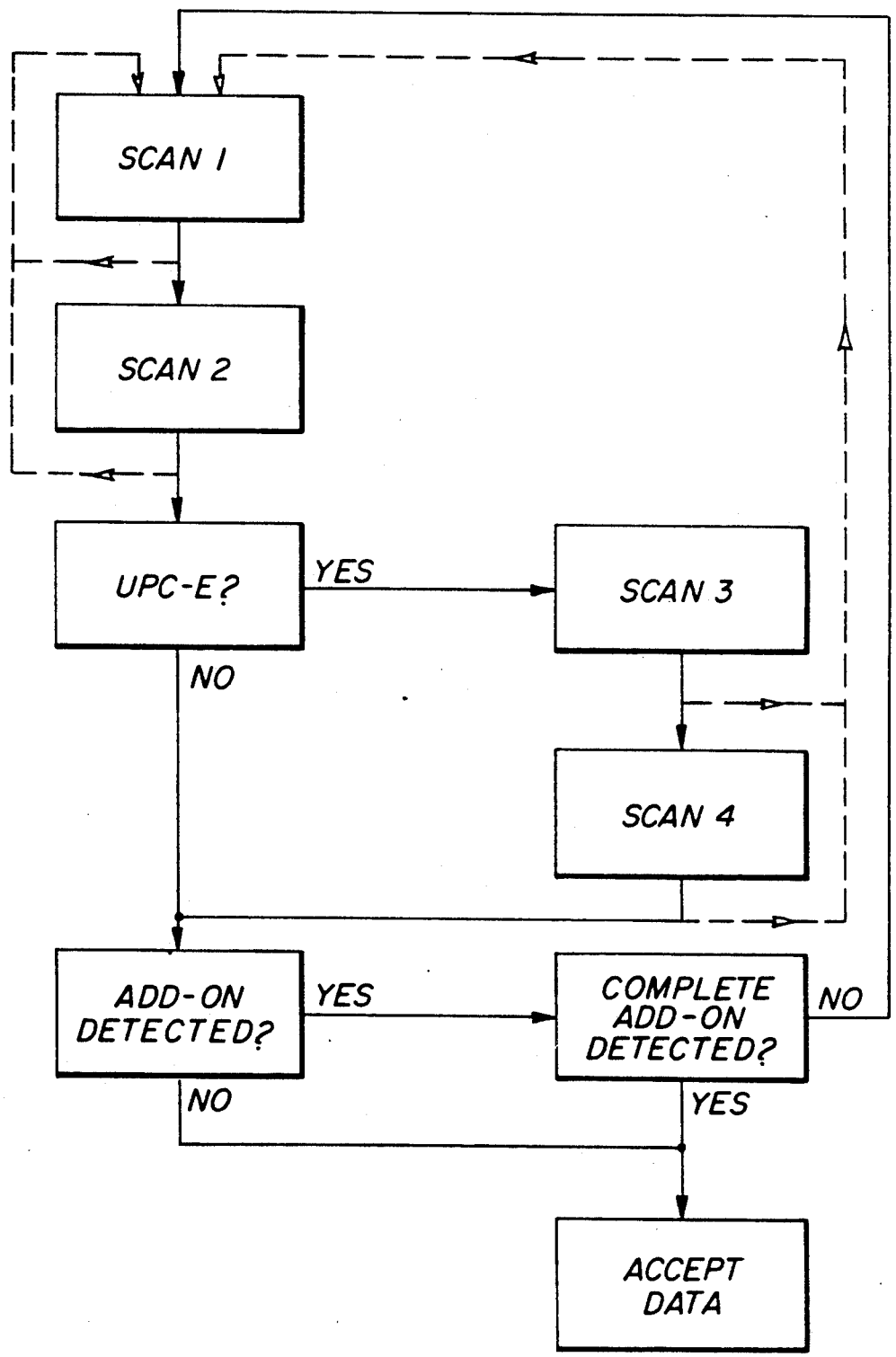
FIG. 9 is a flow chart, illustrating the scanning method of the present invention.

Reference is made to the flow chart of FIG. 9, which is useful in explaining the method of the present invention. Initially a scanning beam is swept across the label until the beam sweeps the entire primary code portion in a first scanning pass along a first scan path, as indicated by "SCAN 1". Next, the scanning beam is immediately swept across the label in a second scanning pass along a second scan path adjacent and parallel to the first scan path, as indicated by "SCAN 2". If, during either of these scanning passes the entire primary code portion of the label is not scanned, the method is reinitialized, as indicated by the dashed lines returning to "SCAN 1". Finally, if an Add-On code portion is not scanned in part during either of the first or second scanning passes, then the data scanned during the first and second scanning passes is accepted as valid scan data. Since the second scan path is displaced from the first scan path, a failure to sweep over an Add-On code portion in two successive scan passes, both of which traverse the entire primary code portion, provides an indication that an Add-On code portion is not to be found on the label. It should be noted that the requirement that the entire primary code portion be traversed by the scan lines results in a requirement that both segments of a two-segment UPC code be scanned.

If the beam sweeps the entire primary code portion in the second scanning pass, and if an Add-On code portion is scanned in its entirety during the first and the second scanning passes, then the data scanned during the first and second scanning passes is accepted as valid scan data. This is reflected in the "ADD-ON DETECTED?" (YES output) and "COMPLETE ADD-ON DETECTED?" (YES output) of FIG. 9. If an Add-On code portion is scanned in part during either of the first or second scanning passes, then rejecting the data scanned during the first and second scanning passes as invalid scan data, as indicated by the "COMPLETE ADD-ON DETECTED?" (NO output).

Due to the low aspect ratio of UPC-E codes, as shown in FIG. 8, a special sequence of steps is followed when such a code is found on a label. As indicated by "UPC-E?", the steps include initially determining if the beam sweeps the primary code portion of a UPC-E bar code label during the first and second scanning passes. If so, the scanning beam immediately sweeps across the label in third and fourth scanning passes along third and fourth respective scan paths adjacent and parallel to the first and second scan paths. If the beam sweeps the entire primary code portion in the third and fourth scanning passes, and if an Add-On code portion is not scanned in part during any of the first, second, third, or fourth scanning passes, then the data scanned during the first, second, third, and fourth scanning passes is accepted as valid scan data. This is indicated by "SCAN 3", "SCAN 4", and "ADD-ON DETECTED?" (NO output). By using an additional two scanning passes, compensation is provided for the lower aspect ratio of UPC-E labels.

If the beam does sweep the entire primary code portion in the second, third and fourth scanning passes, and if an Add-On code portion is scanned in its entirety during all of the first, second, third and fourth scanning passes, then the data scanned during the first, second, third and fourth scanning passes is accepted as valid scan data. This is shown by the YES output of "COMPLETE ADD-ON DETECTED?". On the other hand, if the beam does not sweep the entire primary code portion in the second, third and fourth scanning passes, or if an Add-On code portion is scanned in part during any of the first, second, third or fourth scanning passes, then the data scanned during the first, second, third and fourth scanning passes is rejected as invalid scan data.

The method of the present invention is carried out by means of a scanner of conventional design operating in conjunction with a programmed computer, such as for example an IBM PC personal computer. An appropriate source code listing for effecting this method follows.

```
;*  DECODER CODE FRAGMENT.
;*
;*  SEND A DECODED SEGMENT OR BUFFER A POSSIBLY CONTIGUOUS PAIR OF SEGMENTS
;*  FOR SENDING LATER TO THE CONTROLLER. POSSIBLE CONTIGUOUS PAIRS ARE:
;*       UPC-A,L  * UPC-A,R   or   UPC-A,R  * UPC-A,L
;*       EAN-13,L * UPC-A,R   or   UPC-A,R  * EAN-13,L
;*       EAN-8,L  * EAN-8,R   or   EAN-8,R  * EAN-8,L
;*  OTHER SEGMENTS ARE NEVER SENT AS CONTIGUOUS PAIRS.
;*
;*******************************************************************
              :
              :
              :
;*  SEGMENT FOUND BACKWARD IN THE BUFFER. SEGMENT IS DECODED FROM MARGIN
;*  BACKWARD TO CENTER BAND. (S.P. ALGORITHM C914)

move.b   d3,d7          ; send seg. type byte
```

```
            bsr       outch
            cmp.b     #03Fh,d3        ; else, test seg type; is it UPC_A,R ?
            beq.s     c914_5
            cmp.b     #0Ch,d3         ; or UPC D,N1 ?
            beq.s     c914_5
            cmp.b     #018h,d3        ; or EAN8,R ?
            beq.s     c914_5 bra.s     c914_7          ; if not one of these, skip next step
c914_5:     move.b    label_buf,d5    ; if UPC_A,R or UPC_D1 or EAN8,R move
c914_6:     move.b    -(a4),d7        ; seg reversed
            bsr       outch
            subq.b    #1,d5
            bne.s     c914_6
            bra.s     c914_9
c914_7:     movea.l   #label_buf,a1   ; else, move string forward
            move.b    (a1)+,d5
c914_8:     move.b    (a1)+,d7
            bsr       outch
            subq.b    #1,d5
            bne.s     c914_8
c914_9:
            :
            :
            :

;* SEGMENT FOUND FOREWARD IN THE BUFFER. SEGMENT IS DECODED FROM MARGIN
;* FOREWARD TO CENTER BAND. (S.P. ALGORITHM C919)

move.w    d3,d7           ; get segment type byte cmp.b     #03Fh,d3        ; UPC-A,R
            beq       c919_4b
            cmp.b     #03Ah,d3        ; UPC-A,L
            beq       c919_4b
            cmp.b     #01Dh,d3        ; EAN13,L
            beq       c919_4b
            cmp.b     #019h,d3        ; EAN8,L
            beq       c919_4b
            cmp.b     #018h,d3        ; EAN8,R
            beq       c919_4b
;*
c919_4a:    bsr       outch
            cmp.b     #03Fh,d3        ; else, test seg type; is it UPC_A,R ?
            beq.s     c919_5a
            cmp.b     #0Ch,d3         ; or UPC D,N1 ?
            beq.s     c919_5a
            cmp.b     #018h,d3        ; or EAN8,R ?
            beq.s     c919_5a
            bra       c919_7a         ; if not one of these, skip next step
                                      ; if UPC_A,R or UPC_D1 or EAN8,R reverse
                                      ; string (scanned it backwards).
c919_5a:    moveq     #0,d5
            move.b    label_buf,d5
            movea.l   #label_buf,a4   ; construct a pointer 1 past the
```

```
              add.w      d5,a4              ; last chr in buffer
              addq.w     #1,a4
c919_6a:      move.b     -(a4),d7           ; move chr's offset pre-incremented
              bsr        outch
              subq.b     #1,d5
              bne.s      c919_6a
              bra        c919_9
c919_7a:      movea.l    #label_buf,a4      ; else, store seg string non-reversed
              move.b     (a4)+,d5
c919_8a:      move.b     (a4)+,d7
              bsr        outch
              subq.b     #1,d5
              bne.s      c919_8a
              cmp.b      #0,lbuf1
              beq        c919_8aa
              bsr        MT_lbuf1
c919_8aa:
              bra        c919_9
;***
c919_4b:      cmp.b      #0,lbuf1           ; lbuf1 had better be empty here
              beq        c919_4bb           ; if it isn't, empty it
              bsr        MT_lbuf1
c919_4bb:
              move.b     d3,d7              ; get back the segment I.D.
              movea.l    #lbuf1+1,a0        ; construct a pointer into lbuf1 move.b     d7,(a0)+           ; move seg. I.D. into lbuf1
              addq.b     #1,lbuf1 cmp.b      #03Fh,d3           ; else, test seg type; is it UPC_A,R ?
              beq.s      c919_5b
              cmp.b      #0Ch,d3            ; or UPC D,N1 ?
              beq.s      c919_5b
              cmp.b      #018h,d3           ; or EAN8,R ?
              beq.s      c919_5b
              bra        c919_7b            ; if not one of these, skip next step
                                            ; if UPC_A,R or UPC_D1 or EAN8,R reverse
                                            ; string (scanned it backwards).

c919_5b:      moveq      #0,d5
              move.b     label_buf,d5
              movea.l    #label_buf,a4      ; construct a pointer 1 past the
              add.w      d5,a4              ; last chr in buffer
              addq.w     #1,a4
c919_6b:      move.b     -(a4),d7           ; move chr's offset pre-incremented
              move.b     d7,(a0)+           ; into lbuf1
              addq.b     #1,lbuf1
              subq.b     #1,d5
              bne.s      c919_6b
              bra        c919_9
c919_7b:      movea.l    #label_buf,a4      ; else, store seg string non-reversed
              move.b     (a4)+,d5
c919_8b:      move.b     (a4)+,d7
              move.b     d7,(a0)+
              addq.b     #1,lbuf1
              subq.b     #1,d5
              bne.s      c919_8b
c919_9:
              :
```

```
;* SEGMENT FOUND FOREWARD IN THE BUFFER. SEGMENT IS DECODED FROM MARGIN
;* FOREWARD TO CENTER BAND. (S.P. ALGORITHM C919)

move.v      d3,d7             ; get segment type byte cmp.b       #03Fh,d3          ; UPC-A,R
             beq         c920_1b
             cmp.b       #03Ah,d3          ; UPC-A,L
             beq         c920_1b
             cmp.b       #01Dh,d3          ; EAN13,L
             beq         c920_1b
             cmp.b       #019h,d3          ; EAN8,L
             beq         c920_1b
             cmp.b       #018h,d3          ; EAN8,R
             beq         c920_1b
;*
c920_1a:     bsr         outch
             cmp.b       #03Fh,d3          ; else, test seg type; is it UPC_A,R ?
             beq.s       c920_4a
             cmp.b       #0Ch,d3           ; or UPC_D1 ?
             beq.s       c920_4a
             cmp.b       #018h,d3          ; or EAN8,R ?
             beq.s       c920_4a
                                           ; if not one of these, reverse the string
                                           ; (scanned it backwards)
c920_2a:     moveq       #0,d5
             move.b      label_buf,d5      ; get segment count
             movea.l     #label_buf,a4     ; construct a pointer 1 past the
             add.v       d5,a4             ; last chr in buffer
             addq.v      #1,a4
c920_3a:     move.b      -(a4),d7          ; move chr's offset pre-incremented
             bsr         outch
             subq.b      #1,d5
             bne.s       c920_3a
             bra         c920_6
c920_4a:     movea.l     #label_buf,a4     ; else, store seg string non-reversed
             move.b      (a4)+,d5
c920_5a:     move.b      (a4)+,d7
             bsr         outch
             subq.b      #1,d5
             bne.s       c920_5a
             cmp.b       #0,lbuf1
             beq         c920_5aa
             bsr         MT_lbuf1          ; if ever we get here, empty lbuf1
c920_5aa:
             bra         c920_6
;***
c920_1b:     cmp.b       #0,lbuf1          ; lbuf1 empty?
             beq         c920_1a           ; just send the segment
             movea.l     #lbuf1,a0
             moveq       #0,d5
             move.b      (a0)+,d5
             add.l       d5,a0             ; point a0 just past last chr in lbuf
```

```
              move.b    d7,(a0)+           ; store away the segment I.D.
              addq.b    #1,lbufl cmp.b     #03Fh,d3           ; else, test seg type; is it UPC_A,R ?
              beq.s     c920_4b
              cmp.b     #0Ch,d3            ; or UPC_D1 ?
              beq.s     c920_4b
              cmp.b     #018h,d3           ; or EAN8,R ?
              beq.s     c920_4b
                                           ; if not one of these, reverse the string
                                           ; (scanned it backwards)
c920_2b:      move.b    label_buf,d5       ; get segment count
              movea.l   #label_buf,a4      ; construct a pointer 1 past the
              add.w     d5,a4              ; last chr in buffer
              addq.w    #1,a4
c920_3b:      move.b    -(a4),d7           ; move chr's offset pre-incremented
              move.b    d7,(a0)+
              addq.b    #1,lbufl
              subq.b    #1,d5
              bne.s     c920_3b
              bra       c920_6
c920_4b:      movea.l   #label_buf,a4      ; else, store seg string non-reversed
              move.b    (a4)+,d5
c920_5b:      move.b    (a4)+,d7
              move.b    d7,(a0)+
              addq.b    #1,lbufl
              subq.b    #1,d5
              bne.s     c920_5b
              cmp.b     #0,lbufl
              beq       c920_6
              bsr       MT_lbufl c920_6:
                 :
                 :
                 :

;*********************************************
;*  LBUF1 possible contiguous segment configurations:
;*        0  1   2   3   4   5   6   7   8   9   10  11  12  13  14  15
;*        #  ID  c1  c2  c3  c4  ID  c1  c2  c3  c4                      4+4
;*        #  ID  c1  c2  c3  c4  c5  c6  ID  c1  c2  c3  c4  c5  c6      6+6
;*        #  ID  c1  c2  c3  c4  c5  c6  ID  c1  c2  c3  c4  c5  c6  c7  6+7
;*        #  ID  c1  c2  c3  c4  c5  c6  c7  ID  c1  c2  c3  c4  c5  c6  7+6

MT_lbufl:
              move.b    lbufl+1,d0         ; get I.D. of first seg.

cmp.b     #03Fh,d0           ; UPC A,R?
              beq       MT_LupcAR
              cmp.b     #03Ah,d0           ; UPC A,L?
              beq       MT_LupcAL
              cmp.b     #01Dh,d0           ; EAN13 L?
              beq       MT_Lean13L
              cmp.b     #019h,d0           ; EAN8 L?
              beq       MT_Lean8L
```

```
              cmp.b     #018h,d0          ; EAN8 R?
              beq       MT_Lean8R
              bra       send_lbuf1

MT_LupcAR:
              cmp.b     #03Ah,lbuf1+8     ; is next seg in lbuf1 a UPC A,L?
              bne.s     MT_LupcAR1        ; no...
              bra       set_lbuf1
MT_LupcAR1:
              cmp.b     #01Dh,lbuf1+8     ; then, is it an EAN13 L?
              bne.s     send_lbuf1        ; no...
              bra       set_lbuf1

MT_LupcAL:
              cmp.b     #03Fh,lbuf1+8     ; is next seg in lbuf1 a UPC A,R?
              bne.s     send_lbuf1        ; no...
              bra       set_lbuf1

MT_Lean13L:
              cmp.b     #03Fh,lbuf1+9     ; is next seg in lbuf1 a UPC A,R?
              bne.s     send_lbuf1        ; no...
              bra       set_lbuf1

MT_Lean8L:
              cmp.b     #018h,lbuf1+6     ; is next seg in lbuf1 an EAN8 R?
              bne.s     send_lbuf1        ; no...
              bra       set_lbuf1

MT_Lean8R:
              cmp.b     #019h,lbuf1+6     ; is next seg in lbuf1 an EAN8 L?
              bne.s     send_lbuf1        ; no...

set_lbuf1:
              bset.b    #7,lbuf1+1        ; yes...set high bit of first seg we send send_lbuf1:
              movea.l   #lbuf1+1,a4       ; get the base addr. of lbuf1
              move.b    lbuf1,d0          ; get chr count in d0
              cmp.b     #0,d0
              beq       cleanup
send_lbuf2:
              move.b    (a4)+,d7          ; send chr stream
              bsr       outch
              subq.b    #1,d0
              bne.s     send_lbuf2 cleanup:
              clr.w     lbuf1
              rts

;**************************************************
quit_UPC:
              cmp.b     #0,lbuf1
              beq       no_decode
              bsr       MT_lbuf1
              clr.w     label_buf
              bra       no_decode
```

```
;* CONTROLLER CODE FRAGMENT T~ ~~M~"STRATE A METHOD OF DECODING 'PC-', UPC-E,
;* ~AN-J OR EAN-13 LABELS WI    T  .AL ADDON SEGMENTS.
;*
;* THE FOLLOWING CODE FRAGMENT DEMONSTRATES HOW A LABEL WITH AN OPTIONAL OR
;* REQUIRED ADDON SEGMENT WILL DETECT THE AVAILABLITY OF THE ADDON SEGMENT
;* AND WILL CONCATENATE IT WITH THE MAIN BODY OF THE LABEL.
;*****************************************************************

:
        :
        :

;* ROUTINE:    ADDSEG
;* FUNCTION:   SEE IF A P5 AND/OR P2 ADDON SEGMENT IS REQURED. IF SO
;*             RUN THE MAJORITY TEST AGAINST THE ADDON SEGMENT, IF IT
;*             PASSES MARK IT AS FOUND AND TRY TO FIND THE REST OF THE
;*             LABEL. NOTE THAT ONLY EAN8, EAN13, UPCE AND UPC A LABELS
;*             MAY HAVE ADDON SEGMENTS.
;* ENTRY:      ADDON FLAGS SET OR NOT, SEGMENT BUFFER FOR ADDON'S HAS
;*             AN ADDDON SEGMENT OR NOT.
;* EXIT:       ADDON MARKED AS FOUND IF ALL TESTS PASS. IF NO ADDON RE-
;*             REQUIRED JUST SKIP OVER THIS.
;*             REGISTERS A, B, X, K TRASHED addseg:
        :
        :
        :

ifbit   ad_opt,flag4.b       ; optional addon's?
        jmpl    eans                 ; yes...skip (majority test done in idavl)
        rbit    addon,CCR.b          ; no...kill addon segment available flag
        clr     A                    ; and re-check
addsg2:
        ifbit   p5_req,flag2.b       ; P5 addon required ?
        add     A,#0x05
        ifbit   p2_req,flag2.b       ; P2 addon required ?
        add     A,#0x02
        ifeq    aloc.b,#0x00
        jmp     eans                 ; no addon required !
addsg3:                              ; P2 or P5 addon required
        st      A,K                  ; store calculated required addon type in K
        push    K
        ld      xloc.v,#adscnt       ; do the majority test
        jsrl    majority_test        ; fail = 00    pass = -1
        pop     K
        ifeq    aloc.b,#0x00         ; did it pass?
        jmpl    nocaptl              ; no...keep on looking
addsg4:
        ifeq    kloc.b,#0x07         ; if = 7 either P2 or P5 addon's permitted
        jp      addsg5
        ld      A,adsl+2.b           ; else addon seg available must equal
        and     aloc.v,#0x000F       ; addon seg. type required P2/2, P5/5
        ifeq    aloc.b,kloc.b        ; addon available = addon required ?
        jp      addsg5               ; yes...
        jmpl    nocaptl              ; no...keep on looking
addsg5:
        sbit    addon,CCR.b          ; set addon found flag
```

```
;* Check if we are to attempt ean13 or ean8 labels
;*
eans:
    jsrl   idavl                ; get any pending segments from decoder
    jsrl   polled_comm          ; do polled i/o
    ifbit  ean_en,flag1.b       ; ean label decoder enabled?
    jp     ean13
    jmpl   upcA ;***************************************************************************
;* EAN13 label --> ean13_L + upcA_R
;*
ean13:
    :
    :                           ; code to assemble main label body
    :

ld     IDnx.b,#id_ean13     ; i.d. the label type ifbit  addon,CCR.b          ; addon segment found?
    jp     upcA_addon           ; yes...add it to label
    jmpl   upcfnd               ; no process label for output ;* Include the addon character onto the ean13 string. At start UPCBUF1 is
;* structured:
;*     byte:   0     1     2     3     4     5     6     7
;*           count  d1/d2 d3/d4 d5/d6 d7/d8 d9/d10 d11/d12 d13/0
;*
;* The addon string is added as:
;*     byte:   7     8     9    10
;*           d13/a1 a2/a3 a4/a5  #/?
ean13_addon:
    ld     K,ads1+2.b
    and    kloc.v,#0x0F         ; extract addon string count
    add    upcbuf1.b,kloc.b     ; update the label count
    ld     bloc.v,#upcbuf1+7    ; seg buffer address
    ld     xloc.v,#ads1         ; addon string base addr.
    and    upcbuf1+7.b,#0xF0
ean13_addon1:
    ld     A,[X].b              ; get 1st addon char  a1a2
    swap   A                    ; a2a1
    and    A,#0x0F              ;  0a1
    or     A,[B].b              ; d13/a1 <-- byte 7
    st     A,[B].b
;*
    inc    B
    ld     A,[X+].b             ; get 2nd addon char  a1a2
    swap   A                    ; a2a1
    and    A,#0xF0              ; a20 <-- byte 8
    st     A,[B].b ifeq   kloc.b,#0x02         ; if two chr addon seg, exit here
    jmpl   upcfnd ld     A,[X].b              ; get 3rd addon char  a3a4
    swap   A                    ; a3a4
```

```
        and     A,#0x0F                         ; 0a3
        or      A,[B].b                         ; a2a3 <-- byte 8
        st      A,[B].b
;*
        inc     B
        ld      A,[X+].b                        ; get 4th addon char  a3a4
        svap    A                               ; a4a3
        and     A,#0xF0                         ; a40 <-- byte 9
        st      A,[B].b ld      A,[X].b                         ; get 5th addon char  a5??
        svap    A                               ; ??a5
        and     A,#0x0F                         ; 0a5
        or      A,[B].b                         ; a4a5 <-- byte 8
        st      A,[B].b
        jmpl    upcfnd                          ; process label for output

:
        :
        :

;*********************************************************************
;* EAN8 label --> ean8_L + ean8_R
;*
ean8:
        :
        :                                       ; code to assemble main label body
        :

ld      IDnx.b,#id_ean8                 ; i.d. the label type ifbit   addon,CCR.b                     ; addon segment found?
        jp      upcA_addon                      ; yes...add it to label
        jmpl    upcfnd                          ; no process label for output ;*
;* Include the addon character onto the ean8 string. At start UPCBUF1 is
;* structured:
;*      byte:   0       1       2       3       4
;*              count   d1/d2   d3/d4   d5/d6   d7/d8
;*
;* The addon string is added as:
;*      byte:           5       6       7
;*                    a1/a2   a3/a4   a5/0
ean8_addon:
        ld      X,adsl+2.b
        and     kloc.v,#0x0F                    ; extract addon string count
        add     upcbuf1.b,kloc.b                ; update the label count
        ld      bloc.v,#upcbuf1+5               ; seg buffer address
        ld      :loc.v,#adsl                    ; addon string base addr.
ean8_addon1:
        ld      A,[X+].b
        st      A,[B].b                         ; get a1/a2 & store
        inc     B
        ld      A,[X+].b
        st      A,[B].b                         ; get a3/a4 & store
        inc     B
        ld      A,[X+].b
        and     A,#0xF0
        st      A,[B].b
```

```
        jmpl  upcfnd                  process label for output

:
        :
        :

;********************************************************************
;* UPCA label --> upcA_L + upcA_R + optional/required P2/P5 addon
;*
upcA:
        :
        :                             ; code to assemble main label body
        :

ld    IDnx.b,#id_upcA         ; i.d. the label type ifbit addon,CCR.b             ; addon segment found?
        jp    upcA_addon              ; yes...add it to label
        jmpl  upcfnd                  ; no process label for output ;*
;* Include the addon character onto the UPC A string. At start UPCBUF1 is
;* structured:
;*     byte:  0      1      2      3      4      5      6
;*            count  d1/d2  d3/d4  d5/d6  d7/d8  d9/d10 d11/d12
;*
;* The addon string is added as:
;*     byte:  7      8      9
;*            a1/a2  a3/a4  a5/0
upcA_addon:
        ld    K,ads1+2.b
        and   kloc.v,#0x0F            ; extract addon string count
        add   upcbuf1.b,kloc.b        ; update the label count
        ld    bloc.v,#upcbuf1+7       ; seg buffer address
        ld    xloc.v,#ads1            ; addon string base addr.
        jmpl  ean8_addon1

;********************************************************************
;* UPCE label --> upcE + optional/required P2/P5 addon. The UPC E ticket
;* will be in one of two formats, one including the check character as
;* the last character in a seven character string, the other a six character
;* string with the check character left off.
;* REM  Char 7 is the embedded check character.
;* Compute the checksum "in place":
;*                    char * 3 --> bloc
;*                    char * 1 --> kloc
upcE:
        :
        :                             ; code to assemble main label body
        :                             ; and decide whether check character
        :                             ; is to be included or not ifbit addon,CCR.b             ; addon found?
        jp    upcE_addon
        jmpl  upcfnd
;*
;* Include the addon character onto the UPCE string. At start UPCBUF1 is
;* structured:
;*     byte:  0      1      2      3      4
;*            count  d1/d2  d3/d4  d5/d6  cx/0
```

```
;*
;    he addon string is added
;*       byte:     4       5       6
;*                cx/a1   a2/a3   a4/a5
upcE_addon:
        ld      K,ads1+2.b
        and     kloc.v,#0x0F            ; extract addon string count
        add     upcbuf1.b,kloc.b        ; update the label count and     upcbuf1+4.b,#0xF0
        ld      bloc.v,#upcbuf1+4       ; seg buffer address
        ld      xloc.v,#ads1            ; addon string base addr.

ifbit   EtoA,flag3.b
        jmpl    ean13_addon1
        ifeq    hook.b,#hk_rs232
        jmpl    ean8_addon1
        ifeq    hook.b,#hk_sp_ocia
        jmpl    ean8_addon1
        ifeq    hook.b,#hk_ncr_ocia
        jmpl    ean8_addon1
        jmpl    ean13_addon1

:
                :
                :

;*******************************************
;* ROUTINE:    MAJORITY_TEST
;* FUNCTION:   RUNS THE SEGMENT CORRELATION ALGORITHM FOR UPC/EAN LABELS.
;*             Test for majority minimum requirements. If the number of
;*             mis-reads is defined as  xxSTOT - S1cnt  and the required
;*             number of 'good reads' is equal to S1cnt. Then the test
;*             passes iff:
;*                      MISREADS                GOOD READS
;*                         0                       >= 1
;*                         1                       >= 3
;*                         2                        = 15
;* ENTRY:      Enter the arument with addr. of S1cnt in X. It is assumed
;*             that xxSTOT is always this address plus 1.
;* EXIT:       A pass (-1)/no_pass(0) indication is returned in register A.
majority_test:
        clr     A
        ld      A,[X].b                 ; extract S1cnt (majority count)
        swap    A
        and     aloc.v,#0x0F
        st      A,kloc.v                ; S1cnt --> K ifbit   ad_opt,flag4.b          ; optional addons?
        jp      majority_v_adopt
        jp      majority_vo_adopt
majority_v_adopt:
        ifbit   addon,CCR.b             ; addon segment found?
        jp      majority_v_vand         ; yes...treat like a vand reading majority_vo_adopt:
        ifbit   vand_used,flag4.b       ; vand used to pick up data?
        jp      majority_v_vand
        jp      majority_vo_vand
```

```
rity_v_vand:
    ifeq   A,#0                    ; need at least 1 count
    jmp    mt_err                  ; not there...exit
    jmp    mt_2                    ; there...skip min read required stuff (always 1)

majority_vo_vand:
    ifgt   aloc.b,cntrq.b          ; check min. no. of required good reads + 1
    jp     mt_2                    ; available?
    ifbit  nocapt_timout,flag3.b   ; no, test for no capture delay timeout
    jp     mt_1
    jmp    mt_err                  ; no...return error indication
mt_1:                              ; check min. no. of required counts
    ifeq   aloc.b,cntrq.b          ; check min. no. of required good reads
    jp     mt_2                    ; available = required !
    ifgt   aloc.b,cntrq.b
    jp     mt_2                    ; available > required !
    jmp    mt_err                  ; if not here either...exit with error flag mt_2:
    ld     A,1[X].b                ; xxSTOT --> A
    sc
    subc   A,K                     ; xxSTOT - Slcnt --> A = error count
    and    aloc.v,#0x000F
    ifeq   aloc.b,#0x00            ; CASE 1: no misreads
    jmp    mt_ok
    ifeq   aloc.b,#0x01            ; one misread
    jp     mt_3
    ifeq   aloc.b,#0x02            ; two misreads
    jp     mt_4
    jmp    mt_err1                 ; CASE 4: >2 misreads (we should not get here)
mt_3:                              ; CASE 2: 1 misread
    ifgt   kloc.b,#0x03            ; if good read >= 3, set okay flag
    jp     mt_ok
    ifeq   kloc.b,#0x03
    jp     mt_ok
    jmp    mt_err
mt_4:                              ; CASE 3: 2 misreads
    ifeq   kloc.b,#0x0F            ; if good read = 15, set okay flag
    jp     mt_ok
    jmp    mt_err
mt_ok:                             ; if all tests passed return -1
    ld     A,#0xFF                 ; return Slcnt in K
    ifbit  two_scan,flag4.b        ; TEC 2 scan option enabled?
    ld     cntrq.b,#2              ; yes...do extended test of required counts
    ifbit  ad_opt,flag4.b          ; optional addon seg's enabled?
    ld     cntrq.b,adopt_cnt.b     ; min required count is 3
    ret
mt_err1:
    clr    A                       ; if correlation algorithm failure
    st     A,[X].b                 ; clear variable associated with the
    st     A,1[X].b                ; segment and return
    ifbit  two_scan,flag4.b        ; TEC 2 scan option enabled?
    ld     cntrq.b,#2              ; yes...do extended test of required counts
    ifbit  ad_opt,flag4.b          ; optional addon seg's enabled?
    ld     cntrq.b,adopt_cnt.b     ; min required count is 3
    ret
mt_err:                            ; majority test failed, return 0
    clr    A
    ifbit  two_scan,flag4.b        ; TEC 2 scan option enabled?
    ld     cntrq.b,#2              ;    yes...do extended test of  ui  d counts
    ifbit  ad_opt,flag4.b          ;    optional addon seg's enab.
    ld     cntrq.b,adopt_cnt.b     ; min required count is 3
    ret
```

```
;       :
;       :
;       :
;   CONTROLLER CODE FRAGMENT ‘    ‾EM ‘STRATE A METHOD FOR DECODI'   ‘IP⁻ A,
;   UPC-E, EAN-8 OR EAN-13 LA      ⃪ .H OPTIONAL ADDON ADDON SEG.   ⁻S
;
;* THE FOLLOWING CODE FRAGMENT SHOWS THE COLLECTION AND CORRELATION OF
;* SEGMENTS.
;****************************************************************

;       :
;       :
;       :

;* Collect and correlate segments and label data passed by the DECODER.
idavl:
        ifbit   0,hpc_stat.b            ; data available ??? (1 = data available)
        jp      idavl1                  ; yes...go get it
        ret                             ; no...return
idavl1:
        :
        :
        :
idavl1b:
        sbit    seg_found,CCR.b         ; mark that we've found a segment or label
        clr     A                       ; clear A
        st      A,xloc.v                ; clear X high byte
        st      A,kloc.v                ; clear K  *    * rbit    have_2seg,flag5.b       ; 2nd half of contig. seg flag
        rbit    have_1seg,flag5.b       ; 1st half of contig. seg. flag ld      A,hpc_data.b            ; get the data char.
        st      A,hpc_clr_stat.b        ; clear the dack flag
        ld      hpc_data.b,#0xAA        ; send the ack char ($AA)
        ifbit   7,aloc.b                ; UPC A and EAN 8 and 13 tickets with contig.
        sbit    have_1seg,flag5.b       ; seg's come here with bit 7 set
        and     A,#0x7F
        :
        :
        :

idavl2:
        st      A,bloc.v                ; store the label type in B
        :
        :
        :
;*
;*  BYTE   UPC/EAN SEGMENT STOREAGE:
;*                |------|------|            ** or * --> non-existant cells for four
;*      0         |  1   |  2   |                        char segments
;*                |------|------|
;*      1         |  3   |  4   |            **          --> non-existant cells for r6sx
;*                |------|------|                        segments
;*      2         |  5 * |  6 * |
;*                |------|------|            id          --> 0-9    ean13
;*      3         |7/id**|0/ID**|                        A      upcAL
;*                |------|------|                        D      upcD
;*                                          ID  --> E    upcE
```

```
        ld      workbuf.w,#0x0000        ;- Clear the working seg buff  "workbuf"
        ld      workbuf+2.w,#0x000
        ld      xloc.w,#workbuf          ; get temporary scan buffer storage area
        ifeq    A,#0x3F
        jmpl    r6lp                     ; if A = 3F store UPC_A,R seg.
        ifeq    A,#0x3A
        jmpl    l6lp                     ; if A = 3A store UPC_A,L seg.
        ifeq    A,#0x3E
        jmpl    l6lp                     ; if A = 3E store UPC_E seg.

ifeq    A,#0x22
        jmpl    adlp2                    ; if A = 22 store P2 addon seg.
        ifeq    A,#0x25
        jmpl    adlp5                    ; if A = 25 store P5 addon seg.

ifeq    A,#0x1D
        jmpl    l6lp                     ; if A = 1D store EAN13_L seg.
        ifeq    A,#0x18
        jmpl    r4lp                     ; if A = 18 store EAN8_R seg.
        ifeq    A,#0x19
        jmpl    l4lp                     ; if A = 19 store EAN8_L seg.

:
        :
        :

;*************************************************
endav1:
        ifbit   have_1seg,flag5.b        ; expecting second half of contig. seg's
        jp      endav1D                  ; yes...go get it!
endav1A:
        ifbit   ad_opt,flag4.b           ; are we doing optional addon's
        jp      endav1B
        jp      endav1C                  ; no...quit
endav1B:
        ifeq    Ri4.b,#adscnt            ; did we just work on an addon seg?
        jmpl    endopt                   ; yes...
endav1C:                                 ; no..quit
        pop     K
        pop     X                        ; restore registers and return
        pop     B
        pop     A
        ifbit   0,flag4.b                ; enable wand interrupt?
        sbit    3,enir.b                 ; yes...
        ret
endav1D:
        ifbit   0,hpc_stat.b             ; more data available ???
        jp      endav1E                  ; yes...go get it
        jp      endav1C                  ; no...quit
endav1E:
        rbit    have_1seg,flag5.b
        sbit    have_2seg,flag5.b
        clr     A                        ; clear A
        st      A,xloc.w                 ; clear X
        st      A,kloc.w                 ; clear K
        st      A,bloc.w                 ; clear B
        ld      A,hpc_data.b             ; get the data char.
        st      A,hpc_clr_stat.b         ; clear the dack flag
        ld      hpc_data.b,#0xAA         ; send the ack char
        and     A,#0x7F
```

```
        jmpl    idav12
;**********************
en._pt:                                 ; for optional addon's do the majority
        ld      xloc.v,#adscnt          ; test in place
        clr     A
        ld      A,[X].b                 ; extract Slcnt (majority count)
        swap    A
        and     aloc.v,#0x0F
        st      A,kloc.v                ; adscnt --> K
        ifeq    A,#0                    ; need at least 1 count
        jp      endav1C                 ; not there...exit
endopt2:
        ld      A,1[X].b                ; adstot --> A
        sc
        subc    A,K                     ; adstot - adscnt --> A = error count
        and     aloc.v,#0x000F
        ifeq    aloc.b,#0x00            ; CASE 1: no misreads
        jmpl    endopt_ok
        ifeq    aloc.b,#0x01            ; one misread
        jp      endopt3
        ifeq    aloc.b,#0x02            ; two misreads
        jp      endopt4
        jmp     endopt_err1             ; CASE 4: >2 misreads (we should not get here)
endopt3:                                ; CASE 2: 1 misread
        ifgt    kloc.b,#0x03            ; if good read >= 3, set okay flag
        jp      endopt_ok
        ifeq    kloc.b,#0x03
        jp      endopt_ok
        jp      endopt_err
endopt4:                                ; CASE 3: 2 misreads
        ifeq    kloc.b,#0x0F            ; if good read = 15, set okay flag
        jp      endopt_ok
        jp      endopt_err
endopt_ok:                              ; all tests passed !
        sbit    addon,CCR.b
        rbit    single_scan,flag4.b     ; drop single contig. scan requirement
        jp      endav1C
endopt_err1:
        clr     A                       ; if correlation algorithm failure
        st      A,[X].b                 ; clear variable associated with the
        st      A,1[X].b                ; segment and return
endopt_err:                             ; majority test failed, return 0
        rbit    addon,CCR.b
        sbit    single_scan,flag4.b
        ld      cntrq.b,adopt_cnt.b     ; min required count is 3
        jp      endav1C ;***************************************************
;* Handle addon segments
adlp2:                                  ; TWO CHARACTER ADDON'S
        ld      K,#0x01                 ; load count
        jsrl    lxlp
        ld      workbuf+2.b,#0x02       ; | d1/d2 | 0/0 | 0/2 |
        jp      adlpx
adlp5:
        ld      K,#0x02                 ; loop through lxlp 4 times
        jsrl    lxlp
        jsrl    get1kl                  ; get 5th character
        swap    A
        and     aloc.b,#0xF0
```

```
        or      aloc.b,#0x05                    ;    d1/d2 | d3/d4 | d5/5 |
        st      A,workbuf+2.b                   ; and store it
ac_px:
        ifbit   two_label,flag4.b               ; we cannot use addon's if TEC 2 label mode
        jmpl    endavlC                         ; is on ifbit   addon,CCR.b                     ; don't mess with addon if one collected
        jmpl    endavlC ld      bloc.v,#adscnt
        ld      Ri1.b,#ads1
        ld      Ri2.b,#ads2
        ld      Ri3.b,#0x03
        jmpl    cxseg ;*************************************************
;* <<<<<<<<-- UPC A,R segments
r6lp:
        ld      K,#0x03                         ; store 6 packed char's in 3 bytes of LBUF2
        jsrl    lxlp
        ifbit   seg_en,CCR.b                    ; segment collection enabled ?
        jp      r6lp_go                         ; yes...check & store segment
        jmpl    endavlC                         ; no....just exit
r6lp_go:
        ifbit   single_scan,flag4.b             ; single scan of contig. seg's required?
        jp      r6lp_1                          ; yes...
        jp      r6lp_2
r6lp_1:
        ifbit   have_1seg,flag5.b               ; 1st contig. seg of label?
        jp      r6lp_2
        ifbit   have_2seg,flag5.b               ; 2nd contig seg of label?
        jp      r6lp_2
        jmpl    endavlC                         ; no...dump seg
r6lp_2:
        :
        :
        :

ld      bloc.v,#r6scnt                  ; no...load the variables and check segment
        ld      Ri1.b,#r6s1
        ld      Ri2.b,#r6s2
        ld      Ri3.b,#3
        jmpl    cxseg

:
        :
        :

;*************************************************
;* <<<<<<<<-- UPC D, UPC E and UPC A,L , EAN13,L segments
l6lp:
        ld      K,#0x03
        jsrl    lxlp                            ; get 6 chr's
        ifeq    B,#0x3A                         ; if UPC A,L
        jmpl    l6lpa
        ifeq    B,#0x07                         ; if UPC D
        jmpl    l6lpd
                                                ; else UPC E or EAN13
        jsrl    getlkl                          ; get the seventh chr
```

```
    swap    A
    and     A,#0xF0
    ifeq    B,#0x3E                 ; UPC-E seg ?
    or      A,#0x0E                 ; yes...mark label as UPC E
    st      A,[X].b                 ; <-- both UPC E and EAN13 take this path
    ifeq    B,#0x3E                 ; if UPC E, leave here
    jp      161pe
    jmpl    161p13

;********** UPC D and UPC E SEGMENTS EXIT HERE *******************
161pd:
    ld      A,#0xD0                 ; *** UPC D ***
    st      A,[X].b                 ; | d1/d2 | d3/d4 | d5/d6 | D/0 |
161pe:
    ld      bloc.v,#16scnt          ; *** UPC E ***
    ld      Ri1.b,#16s1             ; | d1/d2 | d3/d4 | d5/d6 | d7/E |
    ld      Ri2.b,#16s2
    ld      Ri3.b,#4
    jmpl    cxseg ;******** ONLY UPC A and EAN13 SEGMENTS GET HERE *************

161pa:
    ld      A,#0xA0                 ; *** UPC A ***
    st      A,[X].b                 ; | d1/d2 | d3/d4 | d5/d6 | A/0 |
    ld      bloc.v,#16scnt          ; load the variables and check segment
    ld      Ri1.b,#16s1
    ld      Ri2.b,#16s2
    ld      Ri3.b,#0x04
161pa_1:                            ; TEST FOR CONTIGUOUS LABEL MODE
    ifbit   single_scan,flag4.b     ; single scan of contig. seg's required?
    jp      161pa_2                 ; yes...
    jmpl    cxseg                   ; no...just collect seg's
161pa_2:
    ifbit   have_1seg,flag5.b       ; yes...1st half of contig. seg's?
    jmpl    cxseg                   ; yes...
    ifbit   have_2seg,flag5.b       ; 2nd half of contig. seg's?
    jmpl    cxseg                   ; yes...
    jmpl    endavlC                 ; no...dump seg ;************************************* EAN13 *
161p13:                             ; | d1/d2 | d3/d4 | d5/d6 | d7/0 |
    ifbit   seg_en,CCR.b            ; segment collection enabled ?
    jp      161p13_go
    jmpl    endavlC                 ; no....just exit
161p13_go:
    ifbit   single_scan,flag4.b     ; contig. seg's required?
    jp      161p13_1                ; yes...
    jp      161p13_2                ; no...try TEC TWO LABEL MODE
161p13_1:
    ifbit   have_1seg,flag5.b       ; yes...1st half of contig. seg's?
    jp      161p13_2
    ifbit   have_2seg,flag5.b       ; 2nd half of contig. seg's?
    jp      161p13_2
    jmpl    endavlC                 ; no...dump it
161p13_2:
    :
    :
    :
```

```
        ld     bloc.v,#16scnt          no...load the variables and   e   segment
        ld     Ri1.b,#16s1
        ld     Ri2.b,#16s2                              SPR 053 PA
        ld     Ri3.b,#4
        jmpl   cxseg
        :
        :
        :

;****************************************************
r4lp:                                  ; EAN8 RIGHT SEGMENTS
        ld     K,#0x02                 ; store 4 packed char's in 2 bytes of LBUF2
        jsrl   lxlp
        ld     bloc.v,#r4scnt
        ld     Ri1.b,#r4s1
        ld     Ri2.b,#r4s2
        ld     Ri3.b,#0x02
r4lp_1:
        ifbit  single_scan,flag4.b     ; single scan of contig. seg's required?
        jp     r4lp_2                  ; yes...
        jmpl   cxseg                   ; no...just collect seg's
r4lp_2:
        ifbit  have_1seg,flag5.b       ; yes...1st half of contig. seg's?
        jmpl   cxseg                   ; yes...
        ifbit  have_2seg,flag5.b       ; 2nd half of contig. seg's?
        jmpl   cxseg                   ; yes...
        jmpl   endavlC                 ; no...dump seg
;****************************************************
l4lp:                                  ; EAN8 LEFT SEGMENTS
        ld     K,#0x02
        jsrl   lxlp
        ld     bloc.v,#l4scnt
        ld     Ri1.b,#l4s1
        ld     Ri2.b,#l4s2
        ld     Ri3.b,#0x02
l4lp_1:
        ifbit  single_scan,flag4.b     ; single scan of contig. seg's required?
        jp     l4lp_2                  ; yes...
        jmpl   cxseg                   ; no...just collect seg's
l4lp_2:
        ifbit  have_1seg,flag5.b       ; yes...1st half of contig. seg's?
        jmpl   cxseg                   ; yes...
        ifbit  have_2seg,flag5.b       ; 2nd half of contig. seg's?
        jmpl   cxseg                   ; yes...
        jmpl   endavlC                 ; no...dump seg

:
        :
        :

;****************************************************
;* Get one char over the local data bus
getlkl:
        ifbit  0,hpc_stat.b            ; wait for the decoder to write data
        jp     gl1                     ; then...get it
        jp     getlkl
gl1:
        clr    A
        ld     A,hpc_data.b            ; get the data
```

```
        st      A,hpc_clr_stat.b         ;lear the dack flag
        ld      hpc_data.b,#0xAA         ; send the ack char
        ret
;****************************************************
;* Store K characters in K/2 packed bytes. Enter
;* with X = upc workbuf and K = byte count (char_count/2).
lxlp:
        jsr     getlkl                   ; get first char
        swap    A                        ; A = xxXx, where X is desired char
        st      A,Ri1.b                  ; Ri1 <-- A
        jsr     getlkl                   ; get next char, A = xxxY
        or      A,Ri1.b                  ; A = xx0Y + xxX0 = xxXY
        st      A,[X].b                  ; A --> (X)
        inc     X                        ; X = X+1
        decsz   K                        ; K = K-1, if K = 0 exit
        jp      lxlp
        ret                              ; at exit X = X+(K/2)+1, next open byte
;****************************************************
;* (1) Compare S1cnt and S2cnt to 0, if S1cnt = 0 store seg.
;* at workbuf in xxS1, else if S2cnt = 0 store seg. in xxS2.
;* Then, increment S1/S2cnt and STOT.
;* (2) Otherwise, check seg. in workbuf against xxS1 and xxS2.
;* If a match is found check S1/S2cnt and increment it and STOT
;* if Sxcnt < $F. If Sxcnt = $F, just exit.
;* Then, check for S2cnt > S1cnt. If so, swap xxS1 and xxS2
;* segements and counts.
;* (3) If STOT >= 3 and STOT-1>S1cnt+S2cnt, clear S1cnt, S2cnt,
;* and STOT. (This allows for a max. of two non-majority counts).
;*
;* Enter: B reg.  = addr. S1/S2cnt (REM: xxSTOT = addr_S1/S2cnt+1)
;*        Ri1     = addr xxS1 seg. buffer
;*        Ri2     = addr xxS2 seg. buffer
;*        Ri3     = seg. byte count
cxseg:
        ifbit   seg_en,CCR.b             ; segment collection enabled ?
        jp      ckseg1                   ; yes...check & store segment
        jmpl    endavlC                  ; no....just exit
ckseg1:
        clr     A
        st      A,xloc.v
        and     bloc.v,#0x00FF           ; extract addr. S1/S2cnt
        ld      R14.b,bloc.b             ; pass it off to R14
;*
        ld      X,Ri1.b                  ; get S1_seg addr.
        ld      A,[B].b                  ; get S1/S2cnt
        swap    A
        and     aloc.v,#0x000F
        ifeq    aloc.b,#0x00             ; no seg.'s found yet!
        jp      stoS1
                                         ; else, seg found already. Are they the same?
        ld      A,[X].v                  ; get first 4 char's of S1_seg
        ifeq    A,workbuf.v              ; same as workbuf ?
        jp      incS1                    ; yes... increment S1cnt & xxSTOT
        jmp     cx_S2                    ; no... check for S2_Seg or other
stoS1:
        ld      K,Ri3.b                  ; get segment byte count
        ld      bloc.v,#workbuf          ; get the temp. buffer base addr.
stoS1a:                                  ; REM  B = xxS1/S2 seg_addr.
        ld      A,[B].b                  ; get char's to move
        st      A,[X].b                  ; move into xxSx segment buffer
```

```
        inc    X
        inc    B
        decsz  kloc.b
        jp     stoS1a
        ld     B,Ri4.b                    ; get back S1/S2cnt addr.
incS1:
        clr    A
        ld     A,[B].b                    ; get S1cnt
        swap   A
        and    aloc.v,#0x000F
        ifeq   aloc.b,#0x0F               ; if S1cnt = $F, just exit
        jmpl   endavl
        ld     A,[B].b
        add    A,#0x10                    ; else, increment S1cnt
        st     A,[B].b
        inc    1[B].b                     ; increment xxSTOT
        jmpl   endavl                     ; then exit
;*
cx_S2:
        ld     X,Ri2.b                    ; get S2_seg addr.
        ld     A,[B].b                    ; extract S2cnt
        and    aloc.v,#0x000F
        ifeq   aloc.b,#0x00               ; if this is the first S2 segment
        jp     stoS2                      ; store the segment in S2_seg
        jp     cx_S2a                     ; else, do further tests
stoS2:
        inc    [B].b                      ; increment S2scnt
        inc    1[B].b                     ; increment xxSTOT
        ld     K,Ri3.b                    ; get segment byte count
        ld     bloc.v,#workbuf            ; get the temp. buffer base addr.
stoS2a:                                   ; REM   B = xxS1/S2 seg_addr.
        ld     A,[B].b                    ; get char's to move
        st     A,[X].b                    ; move into xxSx segment buffer
        inc    X
        inc    B
        decsz  kloc.b                     ; repeat for byte_count pairs
        jp     stoS2a
        jmpl   endavl                     ; and exit
cx_S2a:
        ld     A,[X].v                    ; get char's in S2_seg
        ifeq   A,workbuf.v                ; are they identical with those in workbuf?
        jp     incS2                      ; yes...
        jp     incSTOT                    ; no...we've a new segment not xxS1 or xxS2
incS2:
        inc    [B].b                      ; increment S2scnt
incSTOT:
        inc    1[B].b                     ; increment xxSTOT
;*
;*                                        ; NOW, CHECK FOR MAX. ERROR RATIO
        clr    A
        ld     A,[B].b                    ; get S1/S2cnt
        st     A,X
        swap   A                          ; extract S1cnt --> A
        and    aloc.v,#0x000F
        and    xloc.v,#0x000F             ; extract S2cnt --> B
        ifgt   aloc.b,xloc.b              ; if S1cnt > S2cnt
        jp     cx_S2b
        ifeq   aloc.b,xloc.b              ; if S1cnt = S2cnt
        jp     cx_S2b
```

```
        jp      cx_S2c              ; if S1cnt < S2cnt
cx__2b:
        st      A,xloc.v            ; save S1cnt
        ld      A,1[B].b            ; get xxSTOT
        sc
        subc    A,xloc.b            ; check if xxSTOT - S1scnt > 2
        and     aloc.v,#0x00FF
        ifgt    aloc.b,#0x0002
        jmp     cx_err
        jmpl    endavl
cx_S2c:                             ; REM A = S1cnt    B = S2cnt
        x       A,X                 ; S1scnt --> B    S2cnt --> A
        svap    A
        and     aloc.v,#0x00F0
        or      A,X                 ; make new S1/S2cnt   (S2/S1cnt)
        st      A,[B].b
        svap    A
        and     aloc.v,#0x000F      ; get back new S1cnt
        st      A,xloc.v
        ld      A,1[B].b            ; get xxSTOT
        rc
        subc    A,xloc.b
        and     aloc.v,#0x00FF
        ifgt    aloc.b,#0x02
        jmp     cx_err
cx_S2d:                             ; if okay to here, svap segments
        ld      X,Ri1.b             ; get S1_seg addr.
        ld      B,Ri2.b             ; get S2_seg addr.
        ld      K,Ri3.b             ; get segment byte count
svapseg:
        ld      A,[X].b             ; get S1_seg char
        x       A,[B].b             ; svap S1_seg char with S2_seg char
        st      A,[X].b             ; store S2_seg char in place of S1_seg char
        inc     B
        inc     X
        decsz   kloc.b
        jp      svapseg
        jmpl    endavl
cx_err:
        clr     A
        st      A,[B].b             ; clear S1/S2cnt
        st      A,1[B].b            ; clear xxSTOT
        jmpl    endavlC
```

An alternative embodiment of the method of the present invention is illustrated a flow chart depicted in FIG. 10. Initially a scanning beam is swept across the label until the beam sweeps the entire primary code portion in a first scanning pass along a first scan path, as indicated by "CONTIGUOUS SCAN?" 100. If the scan did not produce a contiguous scan of the entire primary code portion, then a check is made to see if an Add-On code portion is scanned in its entirety at "ADD-ON?" 102. If no Add-On code portion is scanned, the process is reinitialized. If, on the other hand, an Add-On code portion is scanned, the requirement for a contiguous scan is eliminated and if a single segment of the primary code portion has been scanned, then that single segment is accepted as indicated by "SEGMENT SCANNED?" 104. The scanning operation is then continued, if the code is a two segment code, without the requirement of a contiguous scan, until the second segment of the primary code portion is read. In the event that the contiguous scan occurs and an Add-On code portion is detected, as indicated at 106, then the data is accepted in its entirety. If no Add-On is detected, then the scanning beam is immediately swept across the label in a second scanning pass along a second scan path adjacent and parallel to the first scan path, as indicated by "CONTIGUOUS SCAN?" 108. If the entire primary code portion of the label is not scanned, the method is reinitialized, as indicated by the "No" line returning to 100. In the event that the contiguous scan occurs and an Add-On code portion is detected, as indicated at 110, then the data is accepted in its entirety. If no Add-On is detected, then the scanning beam is immediately swept across the label in a third scanning pass along a third scan path adjacent and parallel to the first scan path, as indicated by "CONTIGUOUS SCAN?" 112. If the entire primary code portion of the label is not scanned, the method is reinitialized, as indicated by the "No" line returning to 100. If the primary code portion of the label is scanned contiguously, then the data scanned during the first, second, and third scanning passes is accepted as valid scan data. Since the third scan path is displaced from the first and second scan paths, a failure to sweep over an Add-On code portion in three successive scan passes, each of which traverses the entire primary code portion, provides an indication that an Add-On code portion is not to be found on the label.

According to the present invention, the number of required successive contiguous scans of the primary code portion may be varied as desired. It has been found that between 3 and 7 scans may be desireable in order to assure that there is no Add-On code portion on the label. It should also be noted that if an Add-On is scanned, the Add-On data will be accepted immediately as valid scan data and the requirement for contiguous scanning of both bar code segments is dispensed with. It should also be made clear that if a part of the Add-On portion is scanned at the same time that a label segment in the primary code portion is scanned, then the segment scan data is discarded.

This method is carried out by means of a scanner of conventional design operating in conjunction with a programmed computer, such as for example an IBM PC personal computer. An appropriate source code listing for effecting this method follows.

```
             .TITLE    JELTA33, 'FREEDOM HPC optional   n test release'
;            Part      #R96-0285
;••••••••••••••••••••••••••••••••••••••••••••••••••••••••••••••••••••
;
;                      File:     HPC.ASM
;                Copyright 1987, 1988 Spectra Physics
;
;••••••••••••••••••••••••••••••••••••••••••••••••••••••••••••••••••••

:
        :
        :

; SETUP CODE TO DETERMINE WHETHER ADDON SEGMENTS OPTIONAL,
; REQUIRED OR DISALLOWED AND TO SETUP GOVERNING PARAMETERS
;*
        ld      lbuf+1.b,aloc+1.b       ; store the decoder mask
        rbit    1,lbuf+1.b
        rbit    2,lbuf+1.b
        ifbit   0,aloc.b                ; P2 addon's required ?
        sbit    2,lbuf+1.b
        ifbit   1,aloc.b                ; P5 addon's required ?
        sbit    2,lbuf+1.b
;*
        ifbit   4,aloc+1.b              ; enable optional addon's for UPC/EAN?
        sbit    ad_opt,flag4.b
        ifbit   4,aloc+1.b
        sbit    1,lbuf+1.b
;*
                                        ; calc. no. of times we must see seg's to
                                        ; make a label. Number is actually no.+1
        and     aloc.v,#0x07            ; 8 will be max. allowable reads
        ifeq    aloc.b,#0x00            ; if count = 0 (illegal state)
        ld      A,#0x01                 ; count = 1
        st      A,cntrq.b               ; store number of upc required reads
        :
        :
        :
;*
        ld      A,K                     ; get back adopt_cnt
        and     aloc.v,#0x07            ; mask out adopt_cnt, max 7
        ifeq    A,#0                    ; cannot be 0
```

```
        ld      A,#3
        ifeq    A,#1                    ; cannot be 1
        ld      A,#3                    ; min. adopt count is 3
        ifeq    A,#2
        ld      A,#3
        st      A,adopt_cnt.b

:
            :
            :

decode_upcean:
        ifeq    timout.b,#0             ; no capture timout ?
        sbit    nocapt_timout,flag3.b   ; yes...do special majority_test
;*
        jsrl    idavl
        ifgt    upcbufl.b,#0            ; any upc/ean labels waiting to be sent ?
        jmpl    GoodLabelDecoded2                   ; yes...send them first
;*                                      ; no....
        ld      bloc.v,#upcbufl+1       ; store UPC/EAN label buffer base addr
        ld      upcbufl.b,#0x00

:
            :
            :

addseg:                                 ; check for addon segments
            :
            :
        ifbit   ad_opt,flag4.b          ; addon's are optional
        jmpl    eans ifbit   p5_req,flag2.b          ; addon's are required
        jp      addseg1
        ifbit   p2_req,flag2.b
        jp      addseg1
        jmpl    eans                    ; addon's are not required addseg1:
        ifbit   addon,CCR.b
        jmpl    eans
        jmpl    CantMakeLabel           ; no...keep on looking ;******************************************************************
;* Check if we are to attempt ean13 or ean8 labels
;*
eans:
            :

;******************************************************************
;* EAN13 label --> ean13_L + upcA_R + optional/required P2/P5 addon
;*
ean13:
            :
            :                           ; code to assemble main EAN13 label body
            :
        ifbit   addon,CCR.b             ; addon found ?
```

```
        jp      ean13_addon             ; UPCA for example
        jmpl    GoodLabelDecoded ;*****************************************************************************
;* EAN8 label --> ean8_L + ean8_R + optional/required P2/P5 addon
;*
ean8:
        :
        :                               ; code to assemble main EAN8 label body
        :
        ifbit   addon,CCR.b             ; addon found ?
        jp      ean8_addon              ; see UPCA for example
        jmpl    GoodLabelDecoded ;*****************************************************************************
;* UPCA label --> upcA_L + upcA_R + optional/required P2/P5 addon
;*
upcA:
        ld      bloc.v,#upcbuf1+1       ; store UPC/EAN label buffer  se addr
        ld      xloc.v,#16scnt          ; TEST FOR UPCA_L SEGMENT
        jsrl    majority_test           ; fail = 00    pass = -1
        ifeq    aloc.b,#0x00
        jmpl    CantMakeLabel
upcA2:
        :
        :
        :
        ld      xloc.v,#r6scnt
        jsr     majority_test           ; fail = 00    pass = -1
        ifeq    aloc.b,#0x00
        jmp     upcE
upcA3:
        ld      K,#0x03                 ; byte count of seg.
        ld      xloc.v,#16s1            ; seg buffer address
        jsrl    c64a                    ; calc checksum for seg and store it
        ld      K,#0x03
        ld      xloc.v,#r6s1
        jsrl    c64b
        div     Rv1.v,#0x0A             ; divide checksum by 10
        ifeq    xloc.b,#0x00            ; test mod.10 result
        jp      upcA4
        jsrl    clr6
        jsrl    clr_upcbuf1
        jmpl    CantMakeLabel
upcA4:
        ld      IDnx.b,#id_upcA ifbit   addon,CCR.b             ; addon found ?
        jp      upcA_addon
        jmpl    GoodLabelDecoded
;*
;* Include the addon character onto the UPC A string. At start UPCBUF1 is
;* structured:
;*      byte:   0     1     2     3     4     5     6
;*              count d1/d2 d3/d4 d5/d6 d7/d8 d9/d10 d11/d12
;*
;* The addon string is added as:
;*      byte:   7     8     9
;*              a1/a2 a3/a4 a5/0
```

```
upcA_addon:
    ld      K,ads1+2.b
    and     kloc.v,#0x0F            ; extract addon string count
    add     upcbuf1.b,kloc.b        ; update the label count
    ld      bloc.v,#upcbuf1+7       ; seg buffer address
    ld      xloc.v,#ads1            ; addon string base addr.
    jmpl    ean8_addon1

;*****************************************************************************
;* UPCE label --> upcA_L + optional/required P2/P5 addon
upcE:
    ld      xloc.v,#16scnt          ; do the majority check
    ifbit   ad_opt,flag4.b          ; optional addon's enabled?
    jp      upcEa
    :
    :
    :
upcEa:
    ifgt    cntrq.b,#1
    jp      upcEb
    ld      cntrq.b,#2              ; for upcE tickets, min 2 scans required
    jsrl    majority_test
    ld      cntrq.b,#1              ; restore count
    jp      upcEc
upcEb:
    jsrl    majority_test
upcEc:
    ifeq    aloc.b,#0x00            ; fail = 00    pass = -1
    jmpl    CantMakeLabel
    ifeq    r6scnt.b,#0x00          ; if any R6 seg's don't make an E label
    jp      upcEd
    jmpl    CantMakeLabel
upcEd:
    :
    :                               ; make an E ticket
    :
    ifbit   addon,CCR.b             ; addon found?
    jp      upcE_addon
    jmpl    GoodLabelDecoded
;*
;* Include the addon character onto the UPCE string. At start UPCBUF1 is
;* structured:
;*      byte:  0     1      2      3      4
;*             count d1/d2  d3/d4  d5/d6  cx/0
;*
;* The addon string is added as:
;*      byte:  4     5      6
;*             cx/a1 a2/a3  a4/a5
upcE_addon:
    ld      K,ads1+2.b
    and     kloc.v,#0x0F            ; extract addon string count
    add     upcbuf1.b,kloc.b        ; update the label count and     upcbuf1+4.b,#0xF0
    ld      bloc.v,#upcbuf1+4       ; seg buffer address
    ld      xloc.v,#ads1            ; addon string base addr.

ifbit   EtoA,flag3.b
    jmpl    ean13_addon1
```

```
        ifeq   hook.b,#hk_rs232
        jmpl   ean8_addon1
        ifeq   hook.b,#hk_sp_ocia
        jmpl   ean8_addon1
        ifeq   hook.b,#hk_ncr_ocia
        jmpl   ean8_addon1
        jmpl   ean13_addon1

:
        :
        :

;*****************************************************
;* ROUTINE:   MAJORITY_TEST
;* FUNCTION:  RUNS THE SEGMENT CORRELATION ALGORITHM FOR UPC/EAN LABELS.
;*            Test for majority minimum requirements. If the number of
;*            mis-reads is defined as xxSTOT - Slcnt and the required
;*            number of "good reads" is equal to Slcnt. Then the test
;            passes iff:
;                           MISREADS              GOOD READS
;*                             0                    >= 1
;*                             1                    >= 3
;*                             2                    = 15
;* ENTRY:     Enter the arument with addr. of Slcnt in X. It is assumed
;*            that xxSTOT is always this address plus 1.
;* EXIT:      A pass (-1)/no_pass(0) indication is returned in register A.
majority_test:
        clr    A
        ld     A,[X].b                 ; extract Slcnt  (majority count)
        swap   A
        and    aloc.v,#0x0F
        st     A,kloc.v                ; Slcnt --> K ifbit  ad_opt,flag4.b          ; optional addons?
        jp     majority_v_adopt
        jp     majority_vo_adopt
majority_v_adopt:
        ifbit  addon,CCR.b             ; addon segment found?
        jp     majority_v_vand         ; yes...treat like a vand reading majority_vo_adopt:
        ifbit  vand_used,flag4.b       ; vand used to pick up data?
        jp     majority_v_vand
        jp     majority_vo_vand majority_v_vand:
        ifeq   A,#0                    ; need at least 1 count
        jmp    mt_err                  ; not there...exit
        jmp    mt_2                    ; there...skip min read required stuff (always 1)

majority_vo_vand:
        ifgt   aloc.b,cntrq.b          ; check min. no. of required good reads + 1
        jp     mt_2                    ; available?
        ifbit  CantMakeLabel_timout,flag3.b  ; no, test for no capture delay timeout
        jp     mt_1
        jmp    mt_err                  ; no...return error indication
mt_1:                                  ; check min. no. of required counts
```

```
        ifeq   aloc.b,cntrq.b       ; check min. no. of required good reads
        jp     mt_2                 ; available = required !
        ifgt   aloc.b,cntrq.b
        jp     mt_2                 ; available > required !
        jmp    mt_err               ; if not here either...exit with error flag mt_2:
        ld     A,1[X].b             ; xxSTOT --> A
        sc
        subc   A,K                  ; xxSTOT - Slcnt --> A = error count
        and    aloc.w,#0x000F
        ifeq   aloc.b,#0x00         ; CASE 1: no misreads
        jmp    mt_ok
        ifeq   aloc.b,#0x01         ; one misread
        jp     mt_3
        ifeq   aloc.b,#0x02         ; two misreads
        jp     mt_4
        jmp    mt_err1              ; CASE 4: >2 misreads (we should not get here)
mt_3:                               ; CASE 2: 1 misread
        ifgt   kloc.b,#0x03         ; if good read >= 3, set okay flag
        jp     mt_ok ifeq   kloc.b,#0x03
        jp     mt_ok
        jmp    mt_err
mt_4:                               ; CASE 3: 2 misreads
        ifeq   kloc.b,#0x0F         ; if good read = 15, set okay flag
        jp     mt_ok
        jmp    mt_err
mt_ok:                              ; if all tests passed return -1
        ld     A,#0xFF              ; return Slcnt in K
        :
        :
        :
        ifbit  ad_opt,flag4.b       ; optional addon seg's enabled?
        ld     cntrq.b,adopt_cnt.b  ; min required count is 3
        ret
mt_err1:
        clr    A                    ; if correlation algorithm failure
        st     A,[X].b              ; clear variable associated with the
        st     A,1[X].b             ; segment and return
        :
        :
        :
        ifbit  ad_opt,flag4.b       ; optional addon seg's enabled?
        ld     cntrq.b,adopt_cnt.b  ; min required count is 3
        ret
mt_err:                             ; majority test failed, return 0
        clr    A
        :
        :
        :
        ifbit  ad_opt,flag4.b       ; optional addon seg's enabled?
        ld     cntrq.b,adopt_cnt.b  ; min required count is 3
        ret

:
        :
        :
```

;•••••••••••••••••••••••••••••••••••••••••••••••••••••••••••••••••••••••••
;• Collect and correlate segments and label data
idavl:

:
        :
        :

sbit    seg_found,CCR.b         ; mark that we've found a segment or label
        clr     A                       ; clear A
        st      A,xloc.w                ; clear X high byte
        st      A,kloc.w                ; clear K     *     * rbit    have_2seg,flag5.b       ; 2nd half of contig. seg flag
        rbit    have_1seg,flag5.b       ; 1st half of contig. seg. flag ld      A,hpc_data.b            ; get the data char.
        st      A,hpc_clr_stat.b        ; clear the dack flag
        ld      hpc_data.b,#0xAA        ; send the ack char
        ifbit   7,aloc.b                ; UPC A and EAN 8 and 13 tickets with contig.
        sbit    have_1seg,flag5.b       ; seg's come here with bit 7 set
        and     A,#0x7F
        :
        :
        :

idavl2:
        st      A,bloc.w                ; store the label type in B

:
        :
        :

;•
;•      BYTE UPC/EAN SEGMENT STOREAGE:
;•                      |------|------|          ** or *  --> non-existant cells for four
;•      0               |  1   |  2   |                       char segments
;•                      |------|------|
;•      1               |  3   |  4   |          **      --> non-existant cells for r6sx
;•                      |------|------|                      segments
;•      2               |  5 * |  6 * |
;•                      |------|------|          id      --> 0-9     ean13
;•      3               |7/id|0/ID|                      A       upcAL
;•                      |------|------|                      D       upcD
;•                                                  ID  --> E       upcE idavl3:
        :
        :
        :

ifgt    aloc.b,#0x40            ; if A > $40 it's a non-UPC/EAN code
        jmpl    nonupc                  ; Store it in the label buffer ld      workbuf.w,#0x0000       ;• Clear the working seg buffer "workbuf"
        ld      workbuf+2.w,#0x0000
        ld      xloc.w,#workbuf         ; get temporary scan buffer storage area
        ifeq    A,#0x....

```
        jmpl    .....                   ; decoded segment type jump table
        :
        :
        :

endav1:
        ifbit   have_1seg,flag5.b       ; expecting second half of contig. seg's
        jp      endav1D                 ; yes...go get it!
        ifeq    Ri4.b,#adscnt           ; did we just work on an addon seg?
        jmpl    endopt                  ; yes...
endav1C:                                ; no..quit
        :
        :
        :
        ret endav1D:
        ifbit   0,hpc_stat.b            ; more data available ???
        jp      endav1E                 ; yes...go get it
        jp      endav1C                 ; no...quit
endav1E:
        rbit    have_1seg,flag5.b
        sbit    have_2seg,flag5.b
        clr     A                       ;lear A
        st      A,xloc.v                ; clear X
        st      A,kloc.v                ; clear K
        st      A,bloc.v                ; clear B
        ld      A,hpc_data.b            ; get the data char.
        st      A,hpc_clr_stat.b        ; clear the dack flag
        ld      hpc_data.b,#0xAA        ; send the ack char
        and     A,#0x7F
        jmpl    idav12
;••••••••••••••••••••••••
endopt:                                 ; for addon's do the majority test in place
        rbit    addon,CCR.b             ; kill addon okay flag
        ld      xloc.v,#adscnt
        clr     A
        ld      A,[X].b                 ; extract S1cnt  (majority count)
        swap    A
        and     aloc.v,#0x0F
        st      A,kloc.v                ; adscnt --> K
        ifeq    A,#0                    ; need at least 1 count
        jp      endav1C                 ; not there...exit
        ld      B,cntrq.b
        ifbit   ad_opt,flag4.b
        ld      B,#1
        ifgt    A,B                     ; min count available?
        jp      endopt1                 ; yes...
        jp      endav1C                 ; no...quit
endopt1:
        ld      A,1[X].b                ; adstot --> A
        sc
        subc    A,K                     ; adstot - adscnt --> A = error count
        and     aloc.v,#0x000F ifeq    aloc.b,#0x00            ; CASE 1: no misreads
        jmpl    endopt5
        ifeq    aloc.b,#0x01            ; one misread
        jp      endopt3
```

```
        ifeq    aloc.b,#0x02        ; two misreads
        jp      endopt4
        jmp     endopt_err1         ; CASE 4: >2 misreads (we should not get here)
endopt3:                            ; CASE 2: 1 misread
        ifgt    kloc.b,#0x03        ; if good read >= 3, set okay flag
        jp      endopt5
        ifeq    kloc.b,#0x03
        jp      endopt5
        jmp     endopt_err
endopt4:                            ; CASE 3: 2 misreads
        ifeq    kloc.b,#0x0F        ; if good read = 15, set okay flag
        jp      endopt5
        jmp     endopt_err
endopt5:                            ; majority test passed !
        clr     A
        ifbit   p5_req,flag2.b      ; check addon requirements
        ld      A,#5
        ifbit   p2_req,flag2.b
        add     A,#2
        ifeq    A,#0
        jmpl    endavlC             ; none enabled...quit!
        ifeq    A,#2
        jp      endopt7
        ifeq    A,#5
        jp      endopt8
        jmpl    endopt_ok           ; either 2 or 5 chr addon's acceptable
endopt7:
        ld      A,ads1+2.b          ; only 2 chr addon's acceptable
        and     A,#0x0F
        ifeq    A,#2
        jmpl    endopt_ok
        jmp     endopt_err1
endopt8:
        ld      A,ads1+2.b          ; only 5 chr addon's acceptable
        and     A,#0x0F
        ifeq    A,#5
        jmpl    endopt_ok
        jmp     endopt_err1 endopt_ok:
        sbit    addon,CCR.b
        ifbit   ad_opt,flag4.b      ; if optional addon's enabled
        rbit    single_scan,flag4.b ; drop single contig. scan requirement
        jp      endavlC endopt_err1:
        clr     A                   ; if correlation algorithm failure
        st      A,[X].b             ; clear variable associated with the
        st      A,1[X].b            ; segment and return
endopt_err:                         ; majority test failed, return 0
        rbit    addon,CCR.b
        ifbit   ad_opt,flag4.b      ; if optional addon's enabled
        jp      endopt_err_op
        jp      endavlC
endopt_err_op:
        sbit    single_scan,flag4.b ; re-enable single scan requirement
        ld      cntrq.b,adopt_cnt.b ; min required count is 3
        jp      endavlC
```

```
;* Handle addon segments
adlp2:                              ; TWO CHARACTER ADDON'S
     ld     K,#0x01                 ; load count
     jsrl   lxlp
     ld     workbuf+2.b,#0x02       ; | d1/d2 | 0/0 | 0/2 |
     jp     adlpx
adlp5:
     ld     K,#0x02                 ; loop through lxlp 4 times
     jsrl   lxlp
     jsrl   getlkl                  ; get 5th character
     swap   A
     and    aloc.b,#0xF0
     or     aloc.b,#0x05            ; | d1/d2 | d3/d4 | d5/5 |
     st     A,workbuf+2.b           ; and store it
adlpx:
     :
     :
     :

ifbit  addon,CCR.b             ; don't mess with addon if one collected
     jmpl   endavlC
     ld     bloc.v,#adscnt
     ld     Ri1.b,#ads1
     ld     Ri2.b,#ads2
     ld     Ri3.b,#0x03
     jmpl   cxseg ;-- UPC A,R segments
r6lp:
     ld     K,#0x03                 ; store 6 packed char's in 3 bytes of LBUF2
     jsrl   lxlp
     ifbit  seg_en,CCR.b            ; segment collection enabled ?
     jp     r6lp_go                 ; yes...check & store segment
     jmpl   endavlC                 ; no....just exit
r6lp_go:
     ifbit  single_scan,flag4.b     ; single scan of contig. seg's required?
     jp     r6lp_1                  ; yes...
     jp     r6lp_2
r6lp_1:
     ifbit  have_1seg,flag5.b       ; 1st contig. seg of label?
     jp     r6lp_2
     ifbit  have_2seg,flag5.b       ; 2nd contig seg of label?
     jp     r6lp_2
     jmpl   endavlC                 ; no...dump seg
r6lp_2:
     :
     :
     :
r6lp_2a:
     ld     bloc.v,#r6scnt          ; ...load the variables and check segment
     ld     Ri1.b,#r6s1
     ld     Ri2.b,#r6s2
     ld     Ri3.b,#3
     jmpl   cxseg
     :
     :
     :
```

;-- UPC D, UPC E and UPC A,L , EAN13,L segments
16lp:
```
    ld      K,#0x03
    jsrl    lxlp                    ; get 6 chr's
    ifeq    B,#0x3A                 ; if UPC A,L
    jmpl    16lpa
    ifeq    B,#0x07                 ; if UPC D
    jmpl    16lpd
                                    ; else UPC E or EAN13
    jsrl    getlkl                  ; get the seventh chr
    svap    A
    and     A,#0xF0
    ifeq    B,#0x3E                 ; UPC-E seg ?
    or      A,#0x0E                 ; yes...mark label as UPC E
    st      A,(X).b                 ; <-- both UPC E and EAN13 take this path
    ifeq    B,#0x3E                 ; if UPC E, leave here
    jp      16lpe
    jmpl    16lp13
```
        UPC D and UPC E SEGMENT  :IT HERE
1 .pd:
```
    ld      A,#0xD0                 ; *** UPC D ***
    st      A,(X).b                 ; | d1/d2 | d3/d4 | d5/d6 | D/0 |
16lpe:
    ld      bloc.v,#16scnt          ; *** UPC E ***
    ld      Ril.b,#16s1             ; | d1/d2 | d3/d4 | d5/d6 | d7/E |
    ld      Ri2.b,#16s2
    ld      Ri3.b,#4
    jmpl    cxseg
```

;   ONLY UPC A and EAN13 SEGMENTS GET HERE
16lpa:
```
    ld      A,#0xA0                 ; *** UPC A ***
    st      A,(X).b                 ; | d1/d2 | d3/d4 | d5/d6 | A/0 |
    ld      bloc.v,#16scnt          ; load the variables and check segment
    ld      Ril.b,#16s1
    ld      Ri2.b,#16s2
    ld      Ri3.b,#0x04
16lpa_1:                            ; TEST FOR CONTIGUOUS LABEL MODE
    ifbit   single_scan,flag4.b     ; single scan of contig. seg's required?
    jp      16lpa_2                 ; yes...
    jmpl    cxseg                   ; no...just collect seg's
16lpa_2:
    ifbit   have_1seg,flag5.b       ; yes...1st half of contig. seg's?
    jmpl    cxseg                   ; yes...
    ifbit   have_2seg,flag5.b       ; 2nd half of contig. seg's?
    jmpl    cxseg                   ; yes...
    jmpl    endavlC                 ; no...dump seg
```

;--EAN13 segments
16lp13:                             ; | d1/d2 | d3/d4 | d5/d6 | d7/0 |
```
    ifbit   seg_en,CCR.b            ; segment collection enabled ?
    jp      16lp13_go
    jmpl    endavlC                 ; no....just exit
16lp13_go:
    ifbit   single_scan,flag4.b     ; contig. seg's required?
    jp      16lp13_1                ; yes...
    :
    :
```

```
16lp13_1:
    ifbit   have_1seg,flag5.b      ; yes...1st half of contig. seg's?
    jp      16lp13_2
    ifbit   have_2seg,flag5.b      ; 2nd half of contig. seg's?
    jp      16lp13_2
    jmpl    endavlC                ; no...dump it
    :
    :
    ld      bloc.v,#16scnt         ; ...load the variables and check segment
    ld      Ri1.b,#16s1
    ld      Ri2.b,#16s2
    ld      Ri3.b,#4
    jmpl    cxseg ;--EAN8, right half segments
r4lp:
    ld      K,#0x02                ; store 4 packed char's in 2 bytes of LBUF2
    jsrl    lxlp
    ld      bloc.v,#r4scnt
    ld      Ri1.b,#r4s1
    ld      Ri2.b,#r4s2
    ld      Ri3.b,#0x02
r4lp_1:
    ifbit   single_scan,flag4.b    ; single scan of contig. seg's required?
    jp      r4lp_2                 ; yes...
    jmpl    cxseg                  ; no...just collect seg's
r4lp_2:
    ifbit   have_1seg,flag5.b      ; yes...1st half of contig. seg's?
    jmpl    cxseg                  ; yes...
    ifbit   have_2seg,flag5.b      ; 2nd half of contig. seg's?
    jmpl    cxseg                  ; yes...
    jmpl    endavlC                ; no...dump seg ;--EAN8, left half segments
l4lp:
    ld      K,#0x02
    jsrl    lxlp
    ld      bloc.v,#l4scnt
    ld      Ri1.b,#l4s1
    ld      Ri2.b,#l4s2
    ld      Ri3.b,#0x02
l4lp_1:
    ifbit   single_scan,flag4.b    ; single scan of contig. seg's required?
    jp      l4lp_2                 ; yes...
    jmpl    cxseg                  ; no...just collect seg's
l4lp_2:
    ifbit   have_1seg,flag5.b      ; yes...1st half of contig. seg's?
    jmpl    cxseg                  ; yes...
    ifbit   have_2seg,flag5.b      ; 2nd half of contig. seg's?
    jmpl    cxseg                  ; yes...
    jmpl    endavlC                ; no...dump seg
    :
    :
    :
```

```
nonupc:
    :
    :
    :

;* Get one char over the local data bus
getlkl:
    :
    :
    :

;* Store K characters in K/2 packed bytes. Enter
;* with X = upc workbuf and K = byte count (char_count/2).
lxlp:
    :
    :
    :

;*****************************************
;* (1) Compare S1cnt and S2cnt to 0, if S1cnt = 0 store seg.
    at workbuf in xxS1, els    S2c _ = 0 store seg. in xxS2.
.   Then, increment S1/S2cnt and STOT.
;* (2) Otherwise, check seg. in workbuf against xxS1 and xxS2.
;* If a match is found check S1/S2cnt and increment it and STOT
;* if Sxcnt < $F. If Sxcnt = $F, just exit.
;* Then, check for S2cnt > S1cnt. If so, swap xxS1 and xxS2
;* segements and counts.
;* (3) If STOT >= 3 and STOT-1>S1cnt+S2cnt, clear S1cnt, S2cnt,
;* and STOT. (This allows for a max. of two non-majority counts).
;*
;* Enter:  B reg. = addr. S1/S2cnt (REM: xxSTOT = addr_S1/S2cnt+1)
;*         Ri1    = addr  xxS1 seg. buffer
;*         Ri2    = addr  xxS2 seg. buffer
;*         Ri3    = seg. byte count
cxseg:
    :
    :
    :
            ....   SEGMENT   CODE   SOFTWARE CODE FRAGMENT ;*
;* CHECK FOR SUPPLIMENTAL ADDON SEGMENT.
;*
c926:       bclr.b    #part_add,USR    ; clear parity addon decode flag
            :
            :
            :
            move.b    d1,(a4)+         ; add addon char to addon seg string
            addq.b    #1,label_buf
            bset.b    #part_add,USR    ; set flag indicating partial addon found
            :
            :
            :

c935:       :
            :                          ; good addon segment decoded & sent
            bclr.b    #part_add,USR
            move.w    Ia,iPTR
```

```
                    rts                          ; restore iPTR and exit

:
                    :                            ; main UPC/EAN segment decoding loop
                    :

c914x5:             :
                    :
                    :
                    btst.b      #adopt,DECODERS  ; optional addon's enabled?
                    beq         c914_5a          ; no, send segment immediately
                                                 ; yes...
                    cmp.b       #03Fh,d3         ; was segment UPC-A,R?
                    beq         c914_5br
                    cmp.b       #018h,d3         ; was segment EAN8,R?
                    beq         c914_5br
                    cmp.b       #03Eh,d3         ; was segment UPC-E?
                    beq         c914_5b
                    bra         c914_5a c914_5br:           :
                    :                            ; buffer segment pending outcome of
                    :                            ; addon test bsr         c926             ; look for addon segment
                    btst.b      #part_add,USR    ; part, but not all of an addon found?
                    beq         c914_8b
                    clr.w       lbuf1            ; yes...dump segment
                    :
                    :                            ; else, send segment
                    :
```

Having described the invention in detail and by reference to the preferred embodiments thereof, it will be apparent that other modifications and variations are possible without departing from the scope of the invention defined in the appended claims.

What is claimed is:

1. A method of scanning bar code labels to determine the bar code data printed thereon by repeatedly sweeping a scanning beam in scan paths across the labels, said bar code labels bearing bar codes of the type which include a primary code portion with or without a separate Add-On code portion spaced a given distance from said primary code portion, comprising the steps of:

sweeping a scanning beam across the label until the beam sweeps the entire primary code portion in a first scanning pass along a first scan path;

immediately sweeping the scanning beam across the label in one or more additional scanning passes along additional scan paths adjacent and parallel to each other and to said first scan path;

if the beam sweeps the entire primary code portion in said one or more additional scanning passes, and an Add-On code portion is not scanned in part during any of said first or additional scanning passes, then accepting the data scanned during said first and additional scanning passes as valid scan data;

if the beam sweeps the entire primary code portion in said one or more additional scanning passes, and an Add-On code portion is scanned in its entirety during said first and one or more additional scanning passes, then accepting the data scanned during said first and one or more additional scanning passes as valid scan data; and if the beam sweeps the entire primary code portion in said one or more additional scanning passes and an Add-On code portion is scanned in part during any of said first or additional scanning passes, then rejecting the data scanned during said first and additional scanning passes as invalid scan data.

2. The method of scanning bar code labels of claim 1, including the additional step of:

if the beam does not sweep the entire primary code portion in said second scanning pass, then rejecting the data scanned during said first and second scanning passes as invalid scan data.

3. The method of scanning bar code labels of claim 1, including the additional steps of:

determining if the beam sweeps the primary code portion of a UPC-E bar code label during said first and second scanning passes and, if so, immediately sweeping the scanning beam across the label in third and fourth scanning passes along third and fourth respective scan paths adjacent and parallel to said first and second scan paths; and if the beam sweeps the entire primary code portion in said third and fourth scanning passes, and an Add- On code portion is not scanned in part during any of said first, second, third, or fourth scanning passes, then accepting the data scanned during said first, second, third, and fourth scanning passes as valid scan data.

4. The method of scanning bar code labels of claim 3, including the additional step of:
If the beam does not sweep the entire primary code portion in said second, third and fourth scanning passes, and an Add-On code portion is scanned in its entirety during all of said first, second, third and fourth scanning passes, then accepting the data scanned during said first, second, third and fourth scanning passes as valid scan data.

5. The method of scanning bar code labels of claim 3, including the additional step of:
if the beam does not sweep the entire primary code portion in said second, third and fourth scanning passes, or an Add-On code portion is scanned in part during any of said first, second, third or fourth scanning passes, then rejecting the data scanned during said first, second, third and fourth scanning passes as invalid scan data.

6. A computer controlled bar code scanner for scanning bar code labels to determine the bar code data printed thereon by repeatedly sweeping a scanning beam in scan paths across the labels, said bar code labels bearing bar codes of the type which include a primary code portion with or without a separate Add-On code portion spaced a given distance from the primary code portion, comprising:
scanner means for sweeping a scanning beam across a scanning station and providing a scan signal indicating markings on surfaces presented to said scan station;
computer mans, responsive to said scanner means, for interpreting said scan signal as scan data signified by scanned bar code labels;
said scanner means sweeping the scanning beam across the label until the beam sweeps the entire primary code portion in a first scanning pass along a first scan path and immediately sweeping the scanning beam across the label in one or more additional scanning passes along additional scan paths adjacent and parallel to each other and to said first scan path;
if the beam sweeps the entire primary code portion in said additional scanning passes, and an Add-On code portion is not scanned in part any of said first or additional scanning passes, then said computer means accepts the data scanned during said first additional scanning passes as valid scan data;
if the beam sweeps the entire primary code portion in said one or more additional scanning passes and an Add-On code portion is scanned in its entirety during said first and one or more additional scanning passes, then said computer means accepts the data scanned during said first and one or more additional scanning passes as valid scan data; and,
if the beam sweeps the entire primary code portion in said one or more additional scanning passes and an Add-On code portion is scanned in part during any of said first or additional scanning passes, then said computer means rejects the data scanned during said first and additional scanning passes as invalid scan data.

7. The computer controlled bar code scanner for scanning bar code labels of claim 6, wherein if the beam does not sweep the entire primary code portion in said second scanning pass, then said computer means rejects the data scanned during said first and second scanning passes as invalid scan data.

8. The computer controlled bar code scanner for scanning bar code labels of claim 6,
wherein if the beam sweeps the primary code portion of a UPC-E bar code label during said first and second scanning passes, said scanner means immediately sweeps the scanning beam across the label in third and fourth scanning passes along third and fourth respective scan paths adjacent and parallel to said first and second scan paths; and
if the beam sweeps the entire primary code portion in said third and fourth scanning passes, and an Add-On code portion is not scanned in part during any of said first, second, third, or fourth scanning passes, then said computer means accepts the data scanned during said first, second, third, and fourth scanning passes as valid scan data.

9. The computer controlled bar code scanner for scanning bar code labels of claim 8, wherein if the beam does sweep the entire primary code portion in said second, third and fourth scanning passes, and an Add-On code portion is scanned in its entirety during all of said first, second, third and fourth scanning passes, then said computer means accepts the data scanned during said first, second, third and fourth scanning passes as valid scan data.

10. The computer controlled bar code scanner for scanning bar code labels of claim 9, wherein if the beam does sweep the entire primary code portion in said second, third and fourth scanning passes, or an Add-On code portion is scanned in part during any of said first, second, third and fourth scanning passes, then said computer means rejects the data scanned during said first, second, third and fourth scanning passes as invalid scan data.

11. A method of scanning bar code labels to determine the bar code data printed thereon by repeatedly sweeping a scanning beam in scan paths across the labels, said bar code labels bearing bar codes of the type which includes a primary code portion with or without a separate Add-On code portion positioned a given distance from the primary code portion, comprising the steps of:
sweeping a scanning beam across the label as a first scanning pass;
if the entire primary code portion and an Add-On code portion are scanned, then accepting the data scanned during the first scanning pass as valid scan data; and
if only a segment of the primary code portion and the Add-On code portion are scanned, then accepting the data scanned during the first scanning pass as valid scan data, and immediately sweeping the scanning beam across the label in one or more additional scanning passes until a remaining segment of the primary code portion is scanned.

12. The computer controlled bar code scanner for scanning bar code labels to determine the bar code data printer thereon by repeatedly sweeping a scanning beam in scan paths across the labels, said bar code labels bearing bar codes of the type which include a primary code portion with or without a separate Add-On code portion spaced a given distance from the primary code portion, comprising:
scanner means for sweeping a scanning beam across a scanning station and providing a scan signal indicating markings on surfaces presented to said scan station, and computer means, responsive to said scanner means, for interpreting said scan signal as scan data signified by scanned bar code labels;

said scanner means sweeping the scanning beam across the label as a first scanning pass;

if the entire primary code portion and an Add-On code portion are scanned, then said computer means accepts the data scanned during the first scanning pass as valid scan data; and if only a segment of the primary code portion and the Add-On code portion are scanned, then said computer means accepts the data scanned during the first scanning pass as valid scan data, and said scanner means immediately sweeps the scanning beam across the label in one or more additional scanning passes until a remaining segment of the primary code portion is scanned.

* * * * *

UNITED STATES PATENT AND TRADEMARK OFFICE
CERTIFICATE OF CORRECTION

PATENT NO. : 5,198,649
DATED : March 30, 1993
INVENTOR(S) : Michael T. Brooks

It is certified that error appears in the above-identified patent and that said Letters Patent is hereby corrected as shown below:

Col. 77, ine 8, "If the beam does not sweep" should be --if the beam does sweep--;

Col. 77, line 36, "computer mans" should be --computer means--;

Col. 78, lines 32, "beam does sweep" should be --beam does not sweep--;

Col. 78, line 60, "The computer" should be --A computer--.

Signed and Sealed this

Fourth Day of January, 1994

Attest:

BRUCE LEHMAN

*Attesting Officer*  *Commissioner of Patents and Trademarks*